(12) United States Patent
Christiansson et al.

(10) Patent No.: US 9,430,079 B2
(45) Date of Patent: Aug. 30, 2016

(54) DETERMINING TOUCH DATA FOR ONE OR MORE OBJECTS ON A TOUCH SURFACE

(75) Inventors: Tomas Christiansson, Torna-Hällestad (SE); Mattias Bryborn Krus, Lund (SE)

(73) Assignee: FLATFROG LABORATORIES AB, Lund (SE)

( * ) Notice: Subject to any disclaimer, the term of this patent is extended or adjusted under 35 U.S.C. 154(b) by 355 days.

(21) Appl. No.: 13/502,698

(22) PCT Filed: Oct. 13, 2010

(86) PCT No.: PCT/SE2010/051107
§ 371 (c)(1),
(2), (4) Date: Apr. 18, 2012

(87) PCT Pub. No.: WO2011/049513
PCT Pub. Date: Apr. 28, 2011

(65) Prior Publication Data
US 2012/0212441 A1    Aug. 23, 2012

Related U.S. Application Data

(60) Provisional application No. 61/272,665, filed on Oct. 19, 2009.

(30) Foreign Application Priority Data

Oct. 19, 2009  (SE) .................................... 0950768

(51) Int. Cl.
*G06F 3/041*  (2006.01)
*G06F 3/042*  (2006.01)

(52) U.S. Cl.
CPC ........... *G06F 3/0416* (2013.01); *G06F 3/0421* (2013.01); *G06F 2203/04109* (2013.01)

(58) Field of Classification Search
CPC ............... G06F 3/0416; G06F 3/0421; G06F 2203/04109
USPC ......................................... 345/175
See application file for complete search history.

(56) References Cited

U.S. PATENT DOCUMENTS

| 3,673,327 A | 6/1972 | Johnson et al. |
| 4,254,333 A | 3/1981 | Bergstrom |

(Continued)

FOREIGN PATENT DOCUMENTS

| JP | 2003-330603 A | 11/2003 |
| JP | 2005-004278 A | 1/2005 |

(Continued)

OTHER PUBLICATIONS

International Search Report and Written Opinion issued in International Application No. PCT/SE2010/051107 dated Jan. 24, 2011.

(Continued)

*Primary Examiner* — Aneeta Yodichkas
*Assistant Examiner* — Joseph Fox
(74) *Attorney, Agent, or Firm* — Harness, Dickey & Pierce, P.L.C.

(57) ABSTRACT

A touch-sensing apparatus comprises a light transmissive panel, in which sheets of light are propagated by internal reflection between a touch surface and an opposite surface from an incoupling site to an outcoupling site. The touch-sensing apparatus is configured such that objects touching the touch surface cause a local attenuation of at least two sheets of light. A light sensor arrangement is optically connected to the outcoupling site to measure transmitted light energy. A data processor is connected to the light sensor arrangement and configured to execute a touch determination process. The process operates on at least one projection signal which is indicative of a spatial distribution of light within the outcoupling site.

22 Claims, 15 Drawing Sheets

(56) References Cited

U.S. PATENT DOCUMENTS

| | | | |
|---|---|---|---|
| 5,105,186 A * | 4/1992 | May | 345/175 |
| 6,492,633 B2 * | 12/2002 | Nakazawa et al. | 250/221 |
| 6,690,363 B2 * | 2/2004 | Newton | 345/173 |
| 6,972,753 B1 | 12/2005 | Kimura et al. | |
| 7,432,893 B2 | 10/2008 | Ma et al. | |
| 2001/0002694 A1 | 6/2001 | Nakazawa et al. | |
| 2004/0252091 A1 * | 12/2004 | Ma et al. | 345/87 |
| 2006/0114237 A1 | 6/2006 | Crockett et al. | |
| 2007/0075648 A1 | 4/2007 | Blythe et al. | |
| 2008/0122803 A1 | 5/2008 | Izadi et al. | |
| 2009/0135162 A1 * | 5/2009 | Van De Wijdeven et al. | 345/175 |
| 2009/0153519 A1 * | 6/2009 | Suarez Rovere | G06F 3/0421 345/173 |
| 2010/0097345 A1 * | 4/2010 | Jang | G06F 3/0416 345/174 |
| 2010/0289754 A1 * | 11/2010 | Sleeman | G06F 3/0416 345/173 |
| 2011/0157096 A1 * | 6/2011 | Drumm | 345/175 |
| 2011/0227874 A1 | 9/2011 | Fahraeus et al. | |

FOREIGN PATENT DOCUMENTS

| | | |
|---|---|---|
| WO | WO 02/07072 | 1/2002 |
| WO | WO 2005/026938 | 3/2005 |
| WO | WO 2006/095320 | 9/2006 |
| WO | WO-2008/004103 A2 | 1/2008 |
| WO | WO 2008/032270 | 3/2008 |
| WO | WO 2009/000289 | 12/2008 |
| WO | WO 2009/048365 | 4/2009 |
| WO | WO 2009/102681 | 8/2009 |
| WO | WO 2010/006882 | 1/2010 |
| WO | WO 2010/006883 | 1/2010 |
| WO | WO 2010/006884 | 1/2010 |
| WO | WO 2010/006885 | 1/2010 |
| WO | WO 2010/006886 | 1/2010 |
| WO | WO 2010/134865 | 11/2010 |
| WO | WO 2011/028169 | 3/2011 |
| WO | WO 2011/049511 | 4/2011 |
| WO | WO 2011/049512 | 4/2011 |
| WO | WO 2011/078769 | 6/2011 |
| WO | WO 2011/139213 | 11/2011 |

OTHER PUBLICATIONS

Christer Ericson, "Real-Time Collision Detection", The Morgan Kaufmann Series in Interactive 3D Technology (2005) Chapters 5-9, pp. 125-412.

Joseph O'Rourke, "Computational Geometry in C", Second Edition, Cambridge University Press, (1998), pp. 252-264.

Kak et al, "Principles of Computerized Tomographic Imaging", (1999), The Institute of Electrical Engineers, Inc.

Natterer, et al., "Mathematical Methods in Image Reconstruction", Society for Industrial and Applied Mathematics, (2001).

International Search Report and Written Opinion issued in International Application No. PCT/SE2010/051105 dated Nov. 16, 2010.

Natterer, "The Mathematics of Computerized Tomography", Classics in Applied Mathematics; 32, 2001, pp. 1-222.

Press, et al., "Numerical Recipes The Art of Scientific Computing", Third Edition, Cambridge University Press, 2007, pp. 1-1235.

Barzilai et al., "Two-Point Step Size Gradient Methods", IMA Journal of Numerical Analysis, 1988, pp. 141-148.

Karsten Fourmont, Non-Equispaced Fast Fourier Transforms with Applications to Tomography, The Journal of Fourier Analysis and Applications, vol. 9, Issue 5, 2003, pp. 431-450.

International Search Report and Written Opinion issued in International Application No. PCT/SE2010/051103 dated Jan. 25, 2011.

European Search Report and Written Opinion issued in European Application No. EP 10825284, dated Aug. 8, 2014.

\* cited by examiner

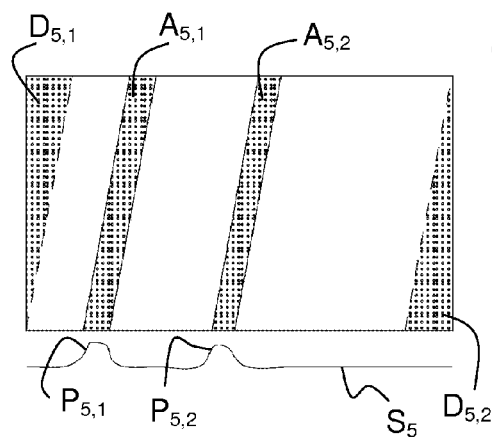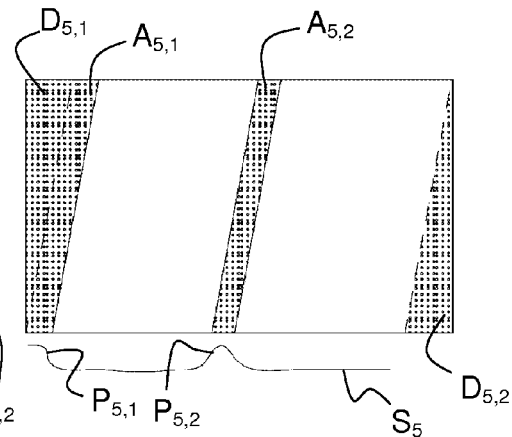
Fig. 5A          Fig. 5B
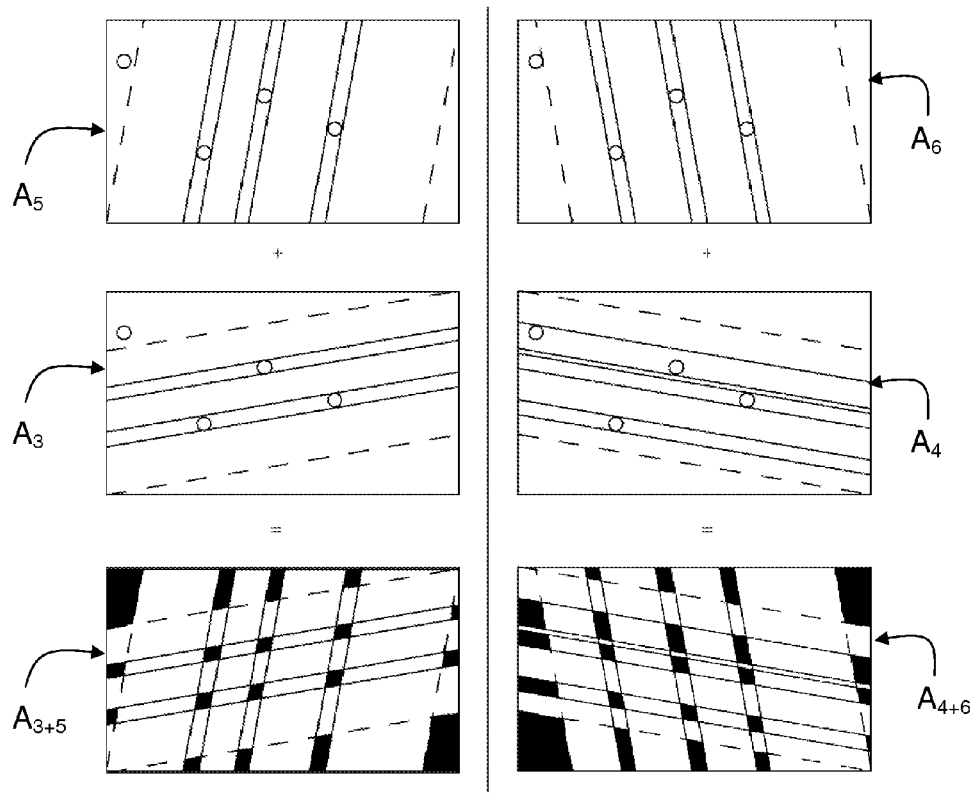
Fig. 6A          Fig. 6B

DETERMINING TOUCH DATA FOR ONE OR MORE OBJECTS ON A TOUCH SURFACE

CROSS-REFERENCE TO RELATED APPLICATIONS

The present application claims the benefit of Swedish patent application No. 0950768-2, filed on Oct. 19, 2009, and U.S. provisional application No. 61/272,665, filed on Oct. 19, 2009, both of which are incorporated herein by reference.

TECHNICAL FIELD

The present invention relates to touch-sensitive panels and data processing techniques in relation to such panels.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc into the panel.

US2004/0252091 discloses an alternative technique which is based on frustrated total internal reflection (FTIR). Light is coupled into a panel to propagate inside the panel by total internal reflection. Arrays of light sensors are located around the perimeter of the panel to detect the light. When an object comes into contact with a surface of the panel, the light will be locally attenuated at the point of touch. The location of the object is determined by triangulation based on the attenuation of the light from each source at the array of light sensors.

US2009/0153519 discloses a panel capable of conducting signals. A tomograph is positioned adjacent the panel with signal flow ports arrayed around the border of the panel at discrete locations. Signals measured at the signal flow ports are tomographically processed to generate a two-dimensional representation of the conductivity on the panel, whereby touching objects on the panel surface can be detected. Tomographic reconstruction, e.g. using the well-known filtered backprojection algorithm, is a processing-intensive operation. Thus, tomographic reconstruction may require significant processing time, especially if a high resolution of the two-dimensional representation is required.

SUMMARY

It is an object of the invention to at least partly overcome one or more limitations of the prior art.

This and other objects, which may appear from the description below, are at least partly achieved by means of a method, a computer program product, a device for determining positions, and a touch-sensing apparatus according to the independent claims, embodiments thereof being defined by the dependent claims.

A first aspect of the invention is a method in a touch-sensing apparatus. The apparatus comprises a light transmissive panel that defines a touch surface and an opposite surface, a light source arrangement for providing sheets of light inside the panel, wherein each sheet comprises light that propagates by internal reflection between the touch surface and the opposite surface from an incoupling site to an outcoupling site, said apparatus further comprising a light sensor arrangement for detecting light reaching the outcoupling site, wherein the touch-sensing apparatus is configured such that one or more objects touching the touch surface causes a local attenuation of at least two sheets of light. The method comprises the steps of: obtaining at least one projection signal which is indicative of a spatial distribution of light within said outcoupling site; processing said at least one projection signal for identification of signal profiles representing said attenuation; identifying, based on the signal profiles, one or more candidate touch areas on the touch surface; processing said at least one projection signal to reconstruct a two-dimensional distribution of signal values within said one or more candidate touch areas; and determining touch data of the or each object by processing the reconstructed signal values within the candidate touch areas.

In one embodiment, the step of identifying comprises: determining, for each signal profile, an attenuation path across the touch surface, wherein the attenuation path has a width which is determined based on the signal profile; and identifying, as a function of a set of thus-determined attenuation paths, said one or more candidate touch areas on the touch surface.

In one embodiment, the step of identifying comprises intersecting the attenuation paths. In such an embodiment, the step of obtaining may comprise: obtaining a plurality of projection signals, each projection signal being associated with a set of dead zones on the touch surface, in which the projection signal is insensitive to objects touching the touching surface; and wherein the step of identifying further comprises intersecting the attenuation paths with the dead zones.

In one embodiment, the step of obtaining comprises: obtaining a plurality of projection signals; and the step of identifying comprises: generating, for each projection signal, a path map which represents the location of the related attenuation paths on the touch surface; and intersecting the generated path maps. In such an embodiment, each path map may be associated with one of said sheets of light, and the step of identifying may comprise: forming pairs of path maps so as to minimize the angle between light rays in the associated sheets; and intersecting said pairs of path maps.

In one embodiment the step of obtaining comprises: obtaining a plurality of projection signals, and the step of identifying comprises: generating, for pairs of projection signals, a path map which represents intersections of the attenuation paths determined for the pair of projection signals; and intersecting the generated path maps. In such an embodiment, each projection signal may be associated with one of said sheets of light, and the step of identifying may comprise: forming said pairs of projection signals so as to maximize the angle between light rays in the associated sheets. In such an embodiment, the step of intersecting may involve geometrically aligning the path maps and executing a logical AND operation on the path maps. Each path map may further represent the location of dead zones on the touch surface, in which the projection signal is insensitive to objects touching the touching surface.

In one embodiment, the step of determining the attenuation path comprises: determining limits of the signal profile; identifying a light path across the touch surface corresponding to the signal profile; and retracing the limits across the touch surface based on the identified light path. In such an embodiment, the step of retracing the limits may comprise: applying a predetermined width function which is representative of a dependence of signal profile width on distance to the incoupling site due to light scattering. In one embodiment, the light scattering is caused by at least one of the touch surface and the opposite surface. The width function may represent the factual width of the object given the width of the signal profile, as a function of distance to the incoupling site.

In one embodiment, the step of determining the attenuation path comprises: representing each attenuation path by a polygon, preferably a convex polygon.

In one embodiment, the sheets of light are generated by sweeping a first set of beams, of light along a first incoupling site, thereby causing the first set of beams to be swept across the touch surface in a first main direction, and by sweeping a second set of beams of light along a second incoupling site, thereby causing the second set of beams to be swept across the touch surface in a second main direction.

In one embodiment, the sheets of light are generated in the form of beams that expand in the plane of the touch surface in a direction away from a respective incoupling site.

In one embodiment, each projection signal is associated with one of the sheets of light.

In one embodiment, the step of obtaining the projection signal comprises: obtaining an energy signal representative of the spatial distribution of light energy within the outcoupling site, and normalizing the energy signal by a background signal, wherein the background signal represents the spatial distribution of light energy within the outcoupling site without objects touching the touch surface.

A second aspect of the invention is a computer program product comprising computer code which, when executed on a data-processing system, is adapted to carry out the method of the first aspect.

A third aspect of the invention is a device for determining touch data for one or more objects on a touch surface included in a touch-sensing apparatus. The device comprises: an element for obtaining at least one projection signal which is indicative of a spatial distribution of light within an outcoupling site; an element for processing said at least one projection signal for identification of signal profiles representing an attenuation; an element for identifying, based on the signal profiles, one or more candidate touch areas on a touch surface; an element for processing said at least one projection signal to reconstruct a two-dimensional distribution of signal values within said one or more candidate touch areas; and an element for determining the touch data for the or each object by processing the reconstructed signal values within the candidate touch areas.

A fourth aspect of the invention is a touch-sensing apparatus, comprising: a light transmissive panel that defines a touch surface and an opposite surface; a light source arrangement for providing sheets of light inside the panel, wherein each sheet comprises light that propagates by internal reflection between the touch surface and the opposite surface from an incoupling site to an outcoupling site; a light sensor arrangement for detecting light reaching the outcoupling site, wherein the touch-sensing apparatus is configured such that an object touching the touch surface locally attenuates at least two sheets of light; and the device for determining touch data according to the third aspect.

Any one of the embodiments of the first aspect can be combined with the second to fourth aspects.

A fifth aspect of the invention is a method in a touch-sensing apparatus. The method comprises the steps of: obtaining at least one projection signal which is indicative of a spatial distribution of light within an outcoupling site; processing said at least one projection signal for identification of signal profiles representing an attenuation; determining, for each signal profile, an attenuation path across a touch surface, wherein the attenuation path has a width which is determined based on the signal profile; identifying, as a function of a set of thus-determined attenuation paths, one or more candidate touch areas on the touch surface; and determining touch data for one or more objects based on the candidate touch areas.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIGS. 5A-5B illustrate attenuation paths and non-illuminated zones for two different projection signals.

FIGS. 6A-6C illustrate polygon sets, polygon intersections and analysis areas obtained for the scan beam embodiment in FIG. 4A.

DETAILED DESCRIPTION OF EXAMPLE EMBODIMENTS

Figure 1A:
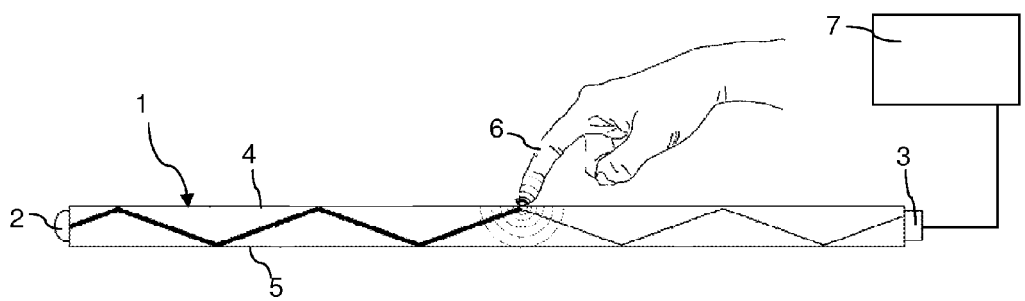
FIG. 1A is a side view of a touch-sensing apparatus.

The present invention relates to techniques for detecting the location of at least one object, and typically multiple objects, on a touch surface of a touch-sensing apparatus. The description starts out by presenting the use of frustrated total internal reflection (FTIR) for touch determination, in relation to a number of exemplifying arrangements for illuminating the interior of a light transmissive panel. Then, a method for touch determination is described and certain steps of the method are discussed in further detail. Finally, the influence of signal dispersion caused by scattering in the light transmissive panel is discussed, as well as how signal dispersion may be used for improving the touch determination method.

Throughout the description, the same reference numerals are used to identify corresponding elements.

The following notation is used for identifying certain signals, signal parameters and signal representations.

$S_i$: spatial transmission signal i
$P_{i,j}$: peak j in spatial transmission signal i
$b_{i,j,l}$: left limit of peak j in spatial transmission signal i
$b_{i,j,r}$: right limit of peak j in spatial transmission signal i
$b_{i,j,m}$: position of local minimum in peak j in spatial transmission signal i
$A_i$: polygon set for spatial transmission signal i
$A_{i,j}$: attenuation path j in polygon set i
$D_{i,j}$: dead zone j in polygon set i
$A_{i+k}$: intersection of polygon sets $A_i$ and $A_k$ Illumination and Detection FIG. 1A is a side view of an exemplifying arrangement in a touch-sensing apparatus. The arrangement includes a light transmissive panel 1, one or more light emitters 2 (one shown) and one or more light sensors 3 (one shown). The panel defines two opposite and generally parallel surfaces 4, 5 and may be planar or curved. A radiation propagation channel is provided between two boundary surfaces of the panel, wherein at least one of the boundary surfaces 4, 5 allows the propagating light to interact with a touching object 6. Typically, the light from the emitter(s) 2 propagates by total internal reflection (TIR) in the radiation propagation channel, and the sensors 3 are arranged at the periphery of the panel 1 to generate a respective output signal which is indicative of the energy of received light.

As shown in FIG. 1A, the light may be coupled into and out of the panel 1 directly via the edge portion that connects the top and bottom surfaces 4, 5 of the panel 1. Alternatively, a separate coupling element (e.g. in the shape of a wedge, not shown) may be attached to the edge portion or to the top or bottom surface 4, 5 of the panel 1 to couple the light into and/or out of the panel 1. When the object 6 is brought sufficiently close to the top surface 4, part of the light may be scattered by the object 6, part of the light may be absorbed by the object 6, and part of the light may continue to propagate unaffected. Thus, when the object 6 touches the top surface 4 of the panel in FIG. 1A, the total internal reflection is frustrated and the energy of the transmitted light is decreased.

The location of the touching object 6 may be determined by measuring the energy of the light transmitted through the panel 1 from a plurality of different directions. This may, e.g., be done by operating a number of spaced-apart emitters 2 to generate a corresponding number of sheets of light inside the panel 1, and by operating the sensors 3 to detect the energy of the transmitted energy of each sheet of light. As long as the touching object attenuates at least two sheets of light, the position of the object can be determined. In the embodiment of FIG. 1A, a data processing device 7 is configured to process the output signal(s) from the sensor(s) 3 to determine the location of the touching object 6.

As indicated in FIG. 1A, the light will not be blocked by the touching object 6. Thus, if two objects happen to be placed after each other along a light path from an emitter 2 to a sensor 3, part of the light will interact with both objects. Provided that the light energy is sufficient, a remainder of the light will reach the sensor 3 and generate an output signal that allows both interactions (touch points) to be identified. Normally, each such touch point has a transmission in the range 0-1, but normally in the range 0.7-0.99. The total transmission $t_i$ along a light path i is the product of the individual transmissions $t_n$ of the touch points on that light path: $t_i = \Pi t_n$. Thus, it may be possible for the data processing device 7 to determine the locations of multiple touching objects, even if they are located in line with a light path.

Figure 1B:
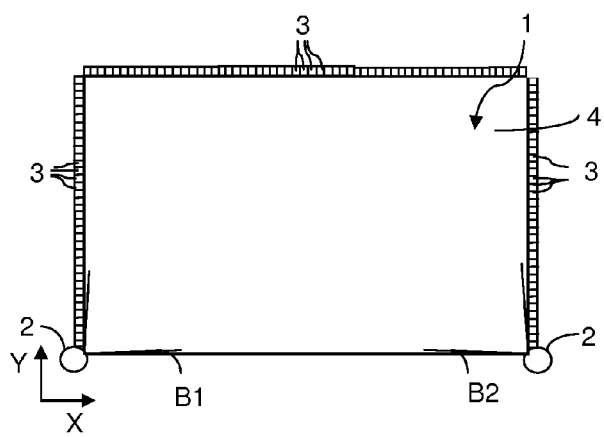
FIG. 1B is a top plan view of a fan beam embodiment of such a touch-sensing apparatus.
Figures 1C, 1D:
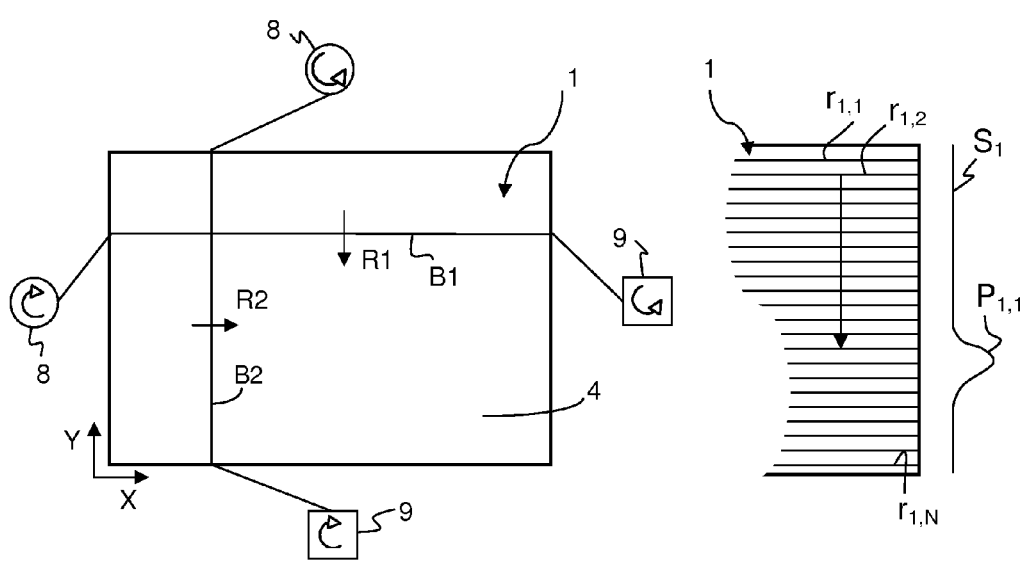
FIG. 1C is a top plan view of a scan beam embodiment of such a touch-sensing apparatus.
FIG. 1D illustrates the generation of a projection signal in a scan beam embodiment.

FIGS. 1B and 1C illustrate exemplary light source arrangements for generating sheets of light inside the light transmissive panel 1, and light sensor arrangements for detecting the transmitted energy of each sheet.

In the embodiment of FIG. 1B, light from two spaced-apart emitters 2 is coupled into the panel 1 to propagate inside the panel 1 by total internal reflection. Each emitter 2 generates a beam B1, B2 of light that expands in the plane of the panel 1 while propagating away from the emitter 2. Such a beam is denoted fan beam, and this type of embodiment is generally referred to as a "fan beam embodiment" in the following. Each fan beam B1, B2 propagates from one or more entry or incoupling points within an incoupling site on the panel 1 to form a sheet of light, which in this example is distributed essentially throughout the entire panel 1. Arrays of light sensors 3 are located around the perimeter of the panel 1 to receive the light from the emitters 2 at a number of spaced-apart outcoupling points within an outcoupling site on the panel 1. The location of the object may be determined by triangulation based on the attenuation of the light from each emitter 2 at the array of light sensors 3. This type of touch-sensing apparatus is, e.g., known from aforesaid US2004/0252091, which is incorporated herein by reference.

In the embodiment of FIG. 1C, two beams B1, B2 are swept across the panel in two different directions R1, R2, and the energy of each transmitted beam is measured during the sweep. Typically, each beam B1, B2 is collimated in the plane of the panel 1. This type of embodiment is generally referred to as a "scan beam embodiment" in the following. The sweeping of a collimated beam B1, B2 forms a sheet of light. Specifically, each beam B1, B2 is generated and swept along a set of entry or incoupling points within an incoupling site on the panel 1 by an input scanner arrangement 8. In the illustrated example, the entry points are located at the left and top edges of the panel 1. The transmitted energy at a number of outcoupling points within an outcoupling site on the panel 1 is measured by an output scanner arrangement 9 which is synchronized with the input scanner arrangement 8 to receive the beam B, B2 as it is swept across the panel 1. In the illustrated example, the outcoupling points are located at the right and bottom edges of the panel 1 opposite to the entry points.

Each output scanner arrangement 9 typically includes a beam scanner and one light sensor (not shown). Similarly, each input scanner arrangement 8 typically includes a light emitter and a beam scanner (not shown). However, it is conceivable that two or more input scanner arrangements share one and the same light emitter, and/or that two or more output scanner arrangements share one and the same light sensor. It is also to be understood that more than two beams can be swept across the panel. Typically, the beams are translated across the panel, i.e. they have an essentially invariant angle (scan angle) in the plane of the panel. Although not shown in FIG. 1C, dedicated optical components are associated with the incoupling and outcoupling sites to re-direct the incoming light from input scanner arrangement 8 into a desired direction ("scan angle") and to re-direct the transmitted light towards a common focal area/point on the output scanner arrangement 9, respectively. In the example of FIG. 1C, the beams B1, B2 are essentially parallel to a respective edge of the panel 1. However, it is conceivable that the scan angle of the beams B1, B2 change as they are swept across the panel 1. The illustrated embodiment and alternative configurations thereof are further disclosed in Applicant's PCT publications WO2010/006882 and WO2010/006885, which are incorporated herein by reference.

In an alternative (not shown) to the embodiment in FIG. 1C, each output scanner arrangement 9 and the redirecting optical components are replaced by a respective elongate sensor, which extends along the panel edge and is optically connected to the panel. Each such elongate sensor is controlled to measure the received energy as a function of time, while a beam is swept along an incoupling site on the panel. Thus, similarly to the embodiment in FIG. 1C, the transmitted energy is measured at a number of outcoupling points with an outcoupling site on the panel, wherein the outcoupling points correspond to different time points in the output signal of the elongate sensor. In a variant, the redirecting optical components are retained but each output scanner arrangement 9 is replaced by a stationary radiation detector, which is arranged in the aforesaid common focal area/point, spaced from the panel edge. In this variant, the stationary radiation detector is controlled to measure the received energy as a function of time, while a beam is swept along an incoupling site on the panel. Such alternatives and variants are further disclosed in Applicant's PCT publications WO2010/006884 and WO2010/006886, which are incorporated herein by reference.

In a further alternative (not shown) to the embodiment in FIG. 1C, the output scanner arrangements 9 are omitted and replaced by retro-reflectors, such that the beams B1, B2 are reflected back to the respective input scanner arrangement 8. Thus, the input scanner arrangements 8 are configured as transceivers that both sweep and receive a beam, to measure the transmitted energy. Such alternatives are further disclosed in Applicant's PCT publication WO 2009/048365, which is incorporated herein by reference.

In all of the above embodiments, the output signals of the sensor(s) 3 represent the measured energy on a total set of detection lines that extend across the panel, with each detection line extending between a unique pair of incoupling and outcoupling points and thus having a unique direction and location on the panel, as seen in a plan view of the panel. Before being subjected to processing for touch determination, the output signals may be aggregated into one spatial transmission signal for each sheet of light. The spatial transmission signal thus represents the received energy at different locations around the perimeter of the panel. The spatial transmission signal could optionally be normalized by a background signal to represent the true transmission (or equivalently, the attenuation) of light at the different locations, as will be further exemplified below. In the following description, a spatial transmission signal is also referred to as a "projection" or "projection signal".

In fan beam embodiments as disclosed herein, one spatial transmission signal is obtained for each emitter, wherein the spatial transmission signal is based on the ensemble of energy values that are measured at all outcoupling points in the system and that are attributed to a specific emitter. In scan beam embodiments as disclosed herein, one spatial transmission signal is obtained for each beam sweep, wherein the spatial transmission signal is based on the ensemble of energy values that are measured while a specific beam is swept along the outcoupling points in the system (typically within a single outcoupling site).

To exemplify this aspect further, FIG. 1D illustrates a spatial transmission signal $S_1$ obtained from the right-end output scanner arrangement 9 in FIG. 1C, or any of the alternatives thereof as discussed above. FIG. 1D also schematically illustrates the corresponding set of detection lines $r_{1,1}, \ldots, r_{1,N}$ for the light beam B1 while it is swept across the panel 1, where the density of detection lines is arbitrary and depends, i.a., on the sampling rate of the output scanner arrangement 9. The spatial transmission signal $S_1$ could, e.g., be given as a function of time, which is equivalent to location along the right-end edge of the panel 1. The transmission signal $S_1$ is illustrated to contain a signal profile $P_{1,1}$ that originates from a touching object (not shown). Generally, such a signal profile $P_{1,1}$ is also denoted "touch signature" in the following.

Touch Determination

Figure 2:
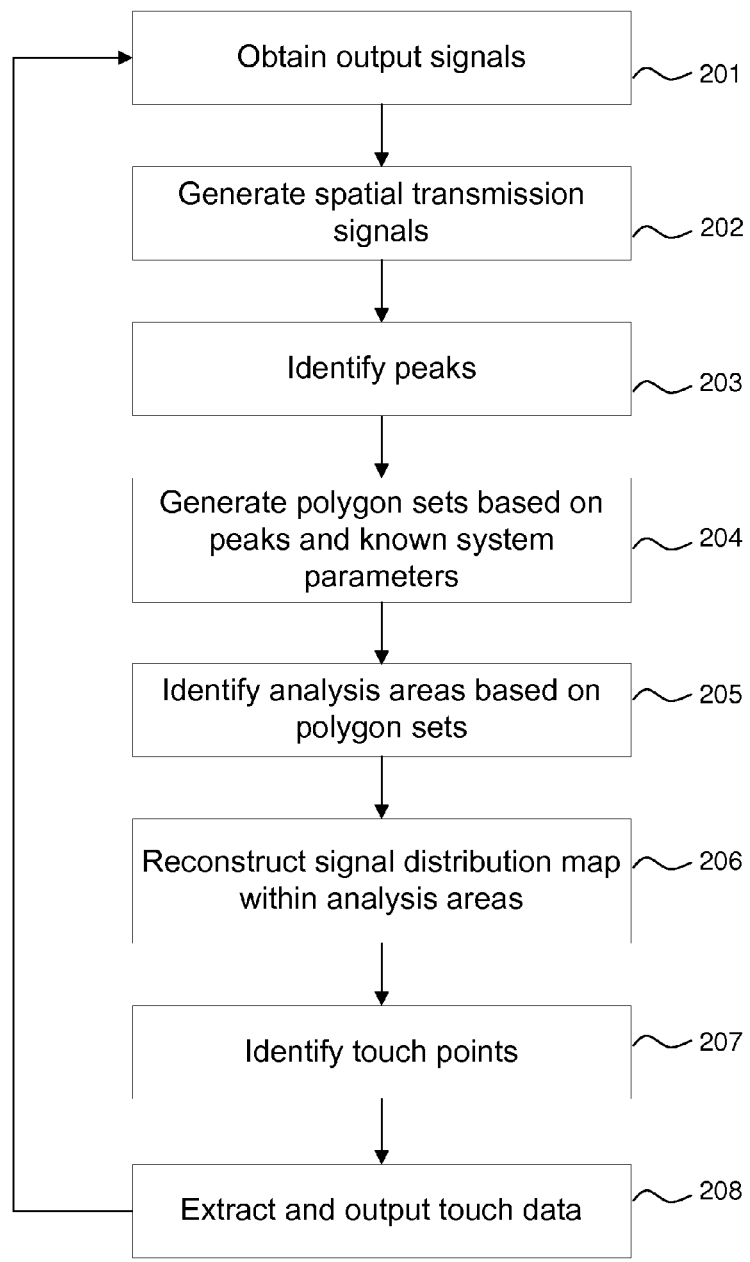
FIG. 2 is a flow chart of method for touch determination according to an embodiment.

FIG. 2 is a flowchart of an exemplifying method for touch determination based on output signals obtained in a touch-sensing apparatus as described and discussed above in relation to FIG. 1. The steps of the method will be briefly explained below, to give an overview of the method and certain advantages of individual steps and/or combinations of steps.

The method is iterative; with each iteration of steps 201-208 being denoted a "sensing instance". Thus, a sensing instance is started, in step 201, by enabling the sampling of output signals from the sensors, typically one energy value for each detection line, while the emitters are activated. Depending on implementation, the emitters may be activated concurrently (at least partly) or in sequence.

Then, in step 202, spatial transmission signals are generated based on the output signals, as described above.

Subsequently, in step 203, the spatial transmission signals are processed for identification of peaks, i.e. potential touch signatures. The result of the processing is a pair of limit points for each peak, wherein the limit points indicate the extent and location of the peak in the spatial transmission signal. Since the spatial transmission signal is correlated to outcoupling points, the pair of limit points is also mapped to a pair of outcoupling points along the periphery of the touch surface.

In step 204, a polygon set is generated for each spatial transmission signal based on the identified limit points. The polygon set represents paths across the touch surface where one or more touching objects may be located, judging from the identified peaks in the spatial transmission signals. The generation of polygon sets makes use of known system parameters, such as the direction of all detection lines across the touch panel and the geometric layout of the panel. Basically, a polygon set is generated by retracing each limit point, from an outcoupling point along its associated detection line across the touch surface, so as to define an attenuation path for each peak. Furthermore, one or more polygons may be added to the attenuation path(s) to account for "dead zones" of each spatial transmission signal, i.e. any zone on the touch surface that is not illuminated by the light that reaches the relevant outcoupling site. Thus, a touching object in a dead zone will not show up as a touch signature in the spatial transmission signal.

Then, in step 205, analysis areas are identified by combining the polygon sets, typically in a logical AND operation. The analysis areas are thus areas on the touch surface where one or more touching objects might be located, considering the information contained in the ensemble of spatial transmission signals generated in step 202.

In step 206, a spatial distribution map is reconstructed based on the spatial transmission signals, but only within the analysis areas (denoted "local reconstruction"). The spatial distribution map represents the spatial distribution of an energy-related parameter (e.g. energy, attenuation or transmission) across the touch surface. Generally speaking, reconstruction of a spatial distribution map is a processing-intensive operation, typically involving one or more of a backprojection algorithm, an over-determined equation system or a statistical model that operates on the spatial transmission signals, or derivatives thereof. By limiting the reconstruction to the analysis areas only, it is possible to achieve a significant reduction in computation time and/or required processing power for the reconstruction. It may also serve to increase the computational stability of the reconstruction process, since the local reconstruction process may be more over-determined than a full reconstruction.

To further illustrate the impact of step 205 on step 206, consider a 40-inch touch panel in widescreen (16:9) format. The total area of such a touch plate is around 4400 $cm^2$. Assume that 10 objects are touching the panel, each object having an area of 1 $cm^2$. In the arrangement of FIG. 1C, with two beams being scanned orthogonally across the panel, the maximum number of analysis areas will be 100, with the maximum total analysis area being about 100 $cm^2$. Thus, by considering only the analysis areas in the reconstruction process, the area to be reconstructed is reduced by a factor of 44.

After the reconstruction, the spatial distribution map is analyzed in step 207 for identification of all true touch points. Then, in step 208, touch data is extracted for the identified touch points and output, and the process is returned to step 201 for a new iteration. Any available touch data may be extracted, including but not limited to x,y coordinates, areas, shapes and/or pressure of the touch points.

Below, embodiments of steps 203-207 will be described in further detail. In the following description it is assumed that the spatial transmission signal represents an attenuation of transmitted light, normalized to fall in the range 0-1. However, it is to be understood that the different steps can also be applied to other formats of the spatial transmission signal, e.g. the energy values or normalized energy values discussed above.

Peak Detection and Analysis (Step 203)

In one embodiment, the spatial transmission signal is processed to detect any peaks with an attenuation above a specified threshold value. The threshold value may be fixed and set at any suitable value, but is generally below 0.25. In one example, the threshold value is set at a very low value, such at about 0.01-0.001, so as to be able to detect the weakest touch signatures. Generally, the threshold value is set above the noise level of the spatial transmission signal. To improve the sensitivity of the peak detection step, it may thus be desirable to pre-process the spatial transmission signal for noise reduction before the peak detection step, using any standard filtering technique, e.g. low-pass filter, median filter, Fourier filter, etc.

Figure 3A:
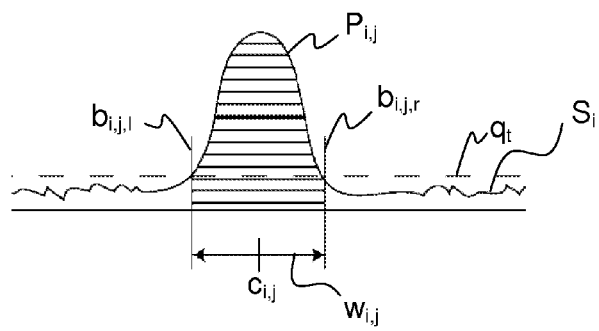
FIGS. 3A-3B are plots of projection signals with touch signatures.

As indicated in FIG. 3A, the peak detection step finds the limit points of $b_{i,j,l}$, $b_{i,j,r}$ of those attenuation peaks $P_{i,j}$ in signal $S_i$ that are stronger than the threshold value $q_t$. Depending on the implementation of the subsequent reconstruction and identification steps 206-207, the peak detection step may also calculate the center point $c_{i,j}$, width $w_{i,j}$, and total (integrated) attenuation (hatched area in FIG. 3A) of the peak $P_{i,j}$. The center point $c_{i,j}$ may, e.g., be identified as the maximum of the peak, or as the mid-point between the limit points $b_{i,j,l}$, $b_{i,j,r}$.

To improve the accuracy of the peak detection step, it is possible to increase the density of signal values in the spatial transmission signal by interpolation, using any suitable interpolation algorithm. This is equivalent to increasing the spatial density of outcoupling points and detection lines associated with the spatial transmission signal.

Another way of increasing the accuracy of the peak detection step is to fit a base function, or a set of base functions, to each peak, and to determine the limit points on the fitted base function(s). The base function(s) may have any shape, e.g. Gaussian bell, Cauchy-Lorentz Distribution, low-pass filtered top-hat function, etc.

Figure 3B:
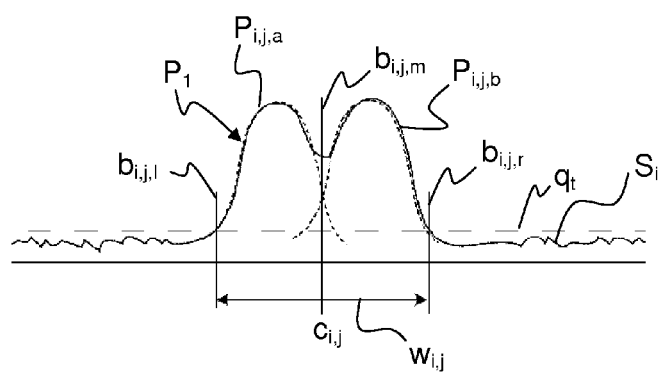

The peak detection step may also be adapted to identify touch signatures $P_{i,j}$ that are formed by overlapping peaks $P_{i,j,a}$, $P_{i,j,b}$ originating from different touching objects, as shown in FIG. 3B, and to separate the overlapping peaks $P_{i,j,a}$, $P_{i,j,b}$. Such separation may be achieved by fitting a set of base functions (indicated by dotted lines in FIG. 3B) to the combined peak $P_{i,j}$, and by determining the limit points of the respective peak based on the fitted base functions.

In an exemplifying peak detection step, each spatial transmission signal is processed by:

1. Start at the left-most end of the spatial transmission signal.
2. Iterate over the signal values in the spatial transmission signal $S_i$, going from left to right, and find the positions where the attenuation becomes larger than the threshold value $q_t$, and where it again becomes smaller than the threshold value $q_t$. Store these positions as limit points $b_{i,j,l}$, $b_{i,j,r}$ of peak $P_{i,j}$. For each peak $P_{i,j}$, also store information whether the peak is bounded or unbounded, i.e. if one of the limit points coincides with an end of the active region (see below) in the spatial transmission signal $S_i$.
3. For each peak $P_{i,j}$, process the limit points $b_{i,j,l}$, $b_{i,j,r}$ to potentially move them slightly away from the peak $P_{i,j}$. For example, each limit point may be moved away from the peak as long as the signal values are decreasing in magnitude. This step may serve to ensure that weak touch signatures will be included as a whole and not only the slim region of the touch signature that has signal values that fall above the threshold value $q_r$. The resulting limit points are then used as limit points in the subsequent calculations.

4. For all peaks $P_{i,j}$, search for local minima between the limit points, using any suitable algorithm, possibly with the added constraint that the depth of a local minimum must exceed a predetermined or preset noise threshold. Store information about local minima $b_{i,j,m}$ for each peak.

5. For all peaks having one or more local minima, split the peaks. The limit points for the split peaks may be determined using the above-mentioned base functions, by using the position of the local minimum as a limit point, or by any other suitable technique.

Generation of Polygon Sets (Step 204)

Figure 4A:
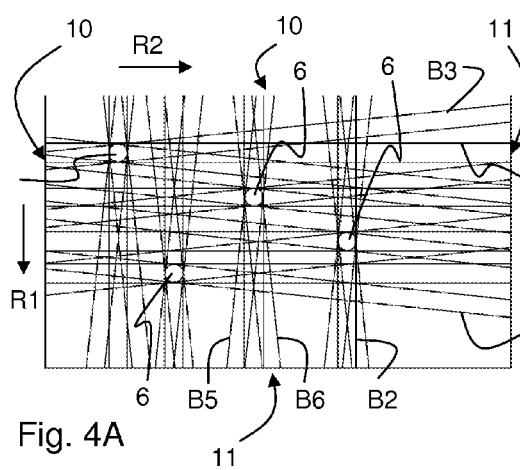
FIG. 4A illustrates a scan beam embodiment with interaction between light rays and touching objects.

For the purpose of explaining and exemplifying the step of generating polygon sets, consider the scan beam embodiment in FIG. 4A. Here, six beams B1-B6 are swept across the touch surface, where a first set of beams B1, B3, B4 are injected for propagation from a first incoupling site 10 to a first outcoupling site 11 while being swept in a first main direction R1, and a second set of beams B2, B5, B6 are injected for propagation from a second incoupling site 10 to a second outcoupling site 11 while being swept in a second main direction R2. The first and second main directions R1, R2 are mutually orthogonal and parallel to the edges of the panel. The first set of beams includes one beam B1 that is perpendicular to the first incoupling site 10, and two non-perpendicular and non-parallel beams B3, B4. The second set of beams includes one beam B2 that is perpendicular to the second incoupling site 10, and two non-perpendicular and non-parallel beams B5, B6.

FIG. 4A illustrates how the center ray of each beam interacts with the outer boundaries of four touching objects 6 on the touch surface.

Figure 4B:
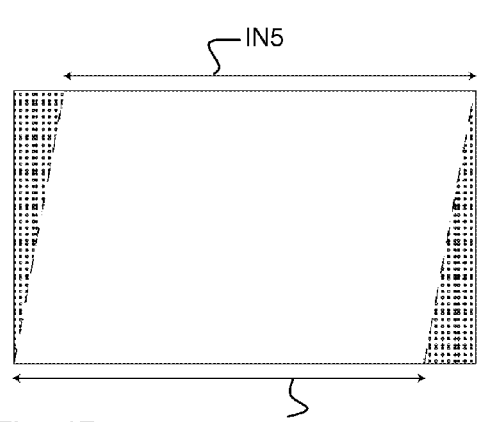
FIG. 4B illustrates non-illuminated zones for a particular beam sweep.

FIG. 4B illustrates the illuminated zone for beam B5. Since the beam B5 is non-perpendicular to the first incoupling site, the beam B5 will only be swept across a subset of the touch panel, leaving certain parts ("dead zones") without (or essentially without) illumination. Arrow IN5 illustrates the extent of the first incoupling site swept by beam B5, whereas arrow OUT5 illustrates the extent of the first outcoupling site swept by beam B5. Arrow OUT5 also indicates the active region of the spatial transmission signal for beam B5 as mapped to the first outcoupling site.

FIG. 5A shows an example of a spatial transmission signal $S_5$ obtained for beam B5, as well as a plan view of the touch panel. Furthermore, attenuation paths $A_{5,1}$, $A_{5,2}$ corresponding to peaks $P_{5,1}$, $P_{5,2}$ in the signal $S_5$ are indicated as hatched areas. Likewise, the dead zones $D_{5,1}$, $D_{5,2}$ associated with signal $S_5$ are indicated as hatched areas.

FIG. 5B shows another example of a spatial transmission signal $S_5$ with peaks $P_{5,1}$, $P_{5,2}$ obtained for beam B5, and the corresponding attenuation paths $A_{5,1}$, $A_{5,2}$ and dead zones $D_{5,1}$, $D_{5,2}$. It may be noted that peak $P_{5,1}$ is unbounded and its attenuation path $A_{5,1}$ at least partially overlaps with the dead zone $D_{5,1}$.

The step of generating polygon sets involves generating polygons that represent all areas on the touch panel where touching objects might be located, based on a spatial transmission signal. The dead zones are included in the polygon set since the spatial transmission signal does not contain information about these zones.

Thus, the hatched areas $A_{5,1}$, $A_{5,2}$, $D_{5,1}$, $D_{5,2}$ in FIGS. 5A and 5B also represent a polygon set for the respective signal $S_5$. It may be noted that dead zone $D_{5,1}$ and the attenuation path $A_{5,1}$ of the unbounded peak $P_{5,1}$ in FIG. 5B may be represented by separate polygons, or by a single combined polygon.

Figure 6C:
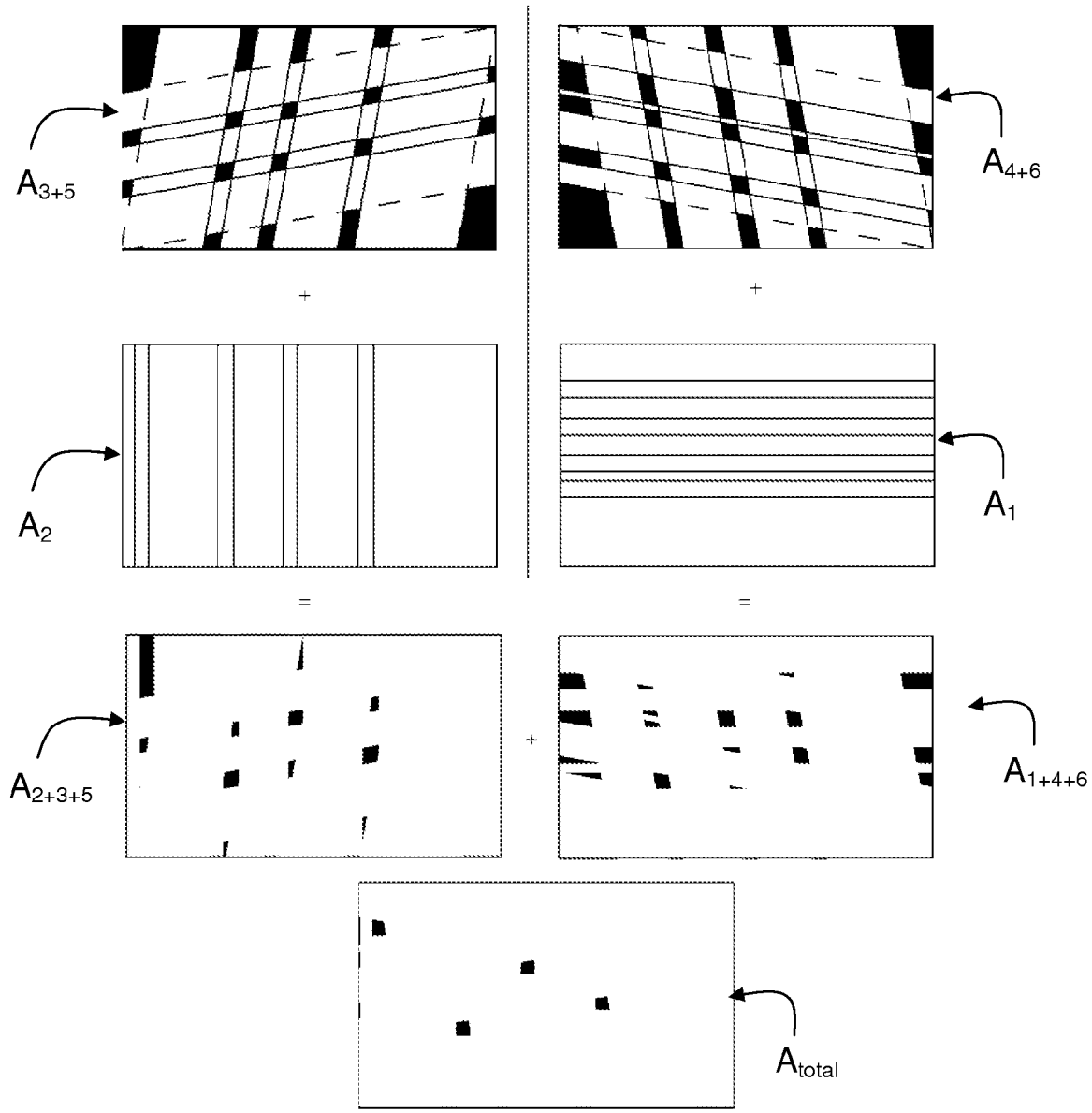

Reverting to the scan beam embodiment and set of touching objects in FIG. 4A, the resulting polygon sets $A_1$-$A_6$ generated for beams B1-B6 are shown in FIGS. 6A-6C. In FIG. 6, as well as in subsequent Figures, full lines indicate the borders of the attenuation paths and dashed lines indicate the limits of the dead zones.

Thus, step 204 results in one polygon set being generated for each spatial transmission signal, wherein the polygon set $A_i$ is the union of all polygons $A_{i,p}$ created for spatial transmission signal $S_i$:

$$A_i = \bigcup_p A_{i,p}$$

Determination of Analysis Areas (Step 205)

The step of determining analysis areas involves estimating or computing the total intersection $A_{total}$ of the polygon sets $A_i$ generated for the different signal transmission signals $S_i$:

$$A_{total} = \bigcap_i A_i$$

The intersection of two polygon sets may be computed by pair-wise matching of the polygons in the two polygon sets, within the coordinate system of the touch panel. As is well known to the skilled person, the computation of an intersection corresponds to performing a logical AND operation.

There are numerous efficient algorithms in the prior art for computing the intersection of polygons, and especially convex polygons. One example is a linear time algorithm presented in Chapter 7.6 of the book "Computational Geometry in C", $2^{nd}$ edition, by Joseph O'Rourke. This book also describes various other tests and algorithms for polygon intersection. Alternatively or additionally, the computation of intersections may use the Separating Axis Theorem (SAT), e.g. as described in Chapter 5 (pp 156-160) of the book "Real Time Collision Detection" by Christer Ericson. Furthermore, it may be advantageous to use a hierarchical geometric structure to avoid the need of testing every polygon pair, e.g. as described in Chapters 6-9 in the same book.

It should be noted that if one polygon is completely located inside another polygon, the intersection of these two polygons will be set equal to the smaller polygon.

FIG. 6 further illustrates the process for intersecting polygon sets. As noted above, $A_1$-$A_6$ denote polygon sets generated for different spatial transmission signals $S_1$-$S_6$. In the example of FIG. 6A, polygon sets $A_5$ and $A_3$ are intersected to generate polygon intersection $A_{3+5}$. Throughout the drawings, polygons included in a polygon intersection are represented by dark fields. In the example of FIG. 6B, polygon sets $A_6$ and $A_4$ are intersected to generate polygon intersection $A_{4+6}$. In the example of FIG. 6C, polygon intersection $A_{3+5}$ is intersected with polygon set $A_2$ to generate polygon intersection $A_{2+3+5}$, and polygon intersection $A_{4+6}$ is intersected with polygon set $A_1$ to generate polygon intersection $A_{1+4+6}$, whereupon polygon intersections $A_{2+3+5}$ and $A_{1+4+6}$ are intersected to generated the final intersection $A_{total}$. The final intersection $A_{total}$ identifies the analysis areas where touching objects might be located. Evidently, the total area that might contain a touching object has been significantly reduced, compared to the total area of the touch surface.

In this specific example, it can be noted that the resulting analysis areas essentially coincide with the touching objects (cf. FIG. 4A), and it may thus be possible to identify touch points directly from the final intersection $A_{total}$, i.e. without applying a reconstruction step (206 in FIG. 2). Thus, it may be possible to omit the reconstruction step, especially when the number of possible touch points to be identified is small in relation to the number of light sheets generated inside the panel.

It can be shown that the sequence in which the polygon sets are combined (intersected) is not important for the end result; any way of combining the polygons from the different polygon sets may be used. However, the number of intersection operations may be decreased by utilizing the information about the inclination of the detection lines for each polygon set.

Figure 7:
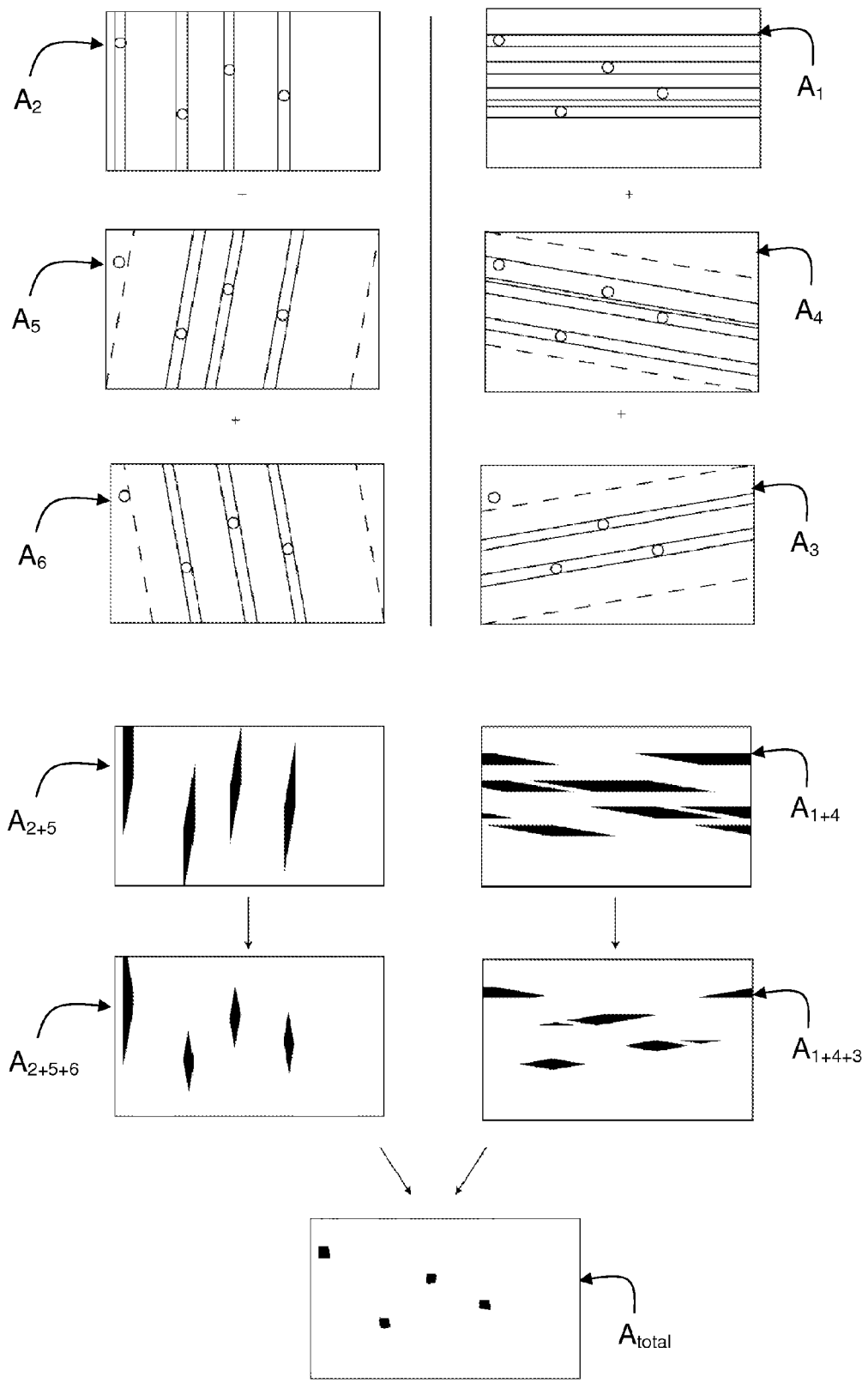
FIG. 7 illustrates the polygon sets of FIG. 6, and the polygon intersections and analysis areas that are obtained with a different order of combining the polygon sets.

Reverting to the example of FIG. 4A, it may be advantageous to separately intersect the group of polygon sets that is associated with a beam sweep in one and the same main direction R1, R2. Furthermore, it may be advantageous for the first intersection within such a group to include the polygon set associated with the perpendicular beam B1, B2, since this tend to remove all dead zone polygons that do not have touches in them. Such an embodiment of the intersection process is exemplified in FIG. 7, wherein polygon sets $A_2$, $A_5$ and $A_6$ (corresponding to sweep direction R2 in FIG. 4A) are intersected in a first group, and polygon sets $A_1$, $A_4$ and $A_3$ (corresponding to sweep direction R1 in FIG. 4A) are intersected in a second group. In the first group, polygon set $A_2$ (which is generated by perpendicular beam B2) is first intersected with polygon set $A_5$, to generate polygon intersection $A_{2+5}$, which is then intersected with polygon set $A_6$, to generate polygon intersection $A_{2+5+6}$. In the second group, polygon set $A_1$ (which is generated by perpendicular beam B1) is first intersected with polygon set $A_4$, to generate polygon intersection $A_{1+4}$, which is then intersected with polygon set $A_3$, to generate polygon intersection $A_{1+4+3}$. The polygon intersections $A_{2+5+6}$ and $A_{1+4+3}$ are then intersected to generate the final intersection $A_{total}$. By comparing FIG. 6 to FIG. 7, it is realized that the number of polygons in the polygon intersections may be reduced significantly by optimizing the order of intersecting the polygon sets.

Figure 8A:
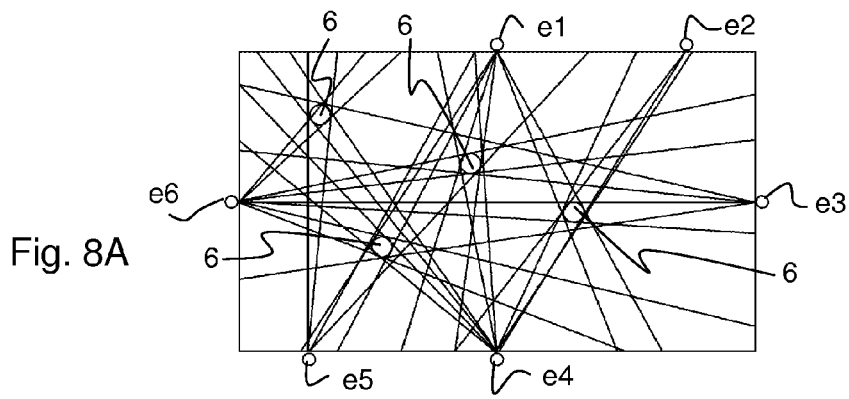
FIG. 8A illustrates a fan beam embodiment with interaction between light rays and touching objects.

It is to be understood that the above-described processes for generation and intersection of polygon sets may be implemented also in a fan beam embodiment. FIG. 8A illustrates an example of such a fan beam embodiment, in which six emitters e1-e6 are located at a respective incoupling site around the periphery of the touch panel, and the transmitted energy from each emitter e1-e6 is measured by sensors (not shown) located at an outcoupling site that extends around the entire perimeter of the touch panel. Thus, each emitter e1-e6 generates a beam of light which is injected into the panel to form a respective sheet of light that expands in the plane of the panel away from the emitter. FIG. 8A also illustrates beam rays that interact with the outer boundaries of four touching objects 6 on the touch surface.

Figure 8B:
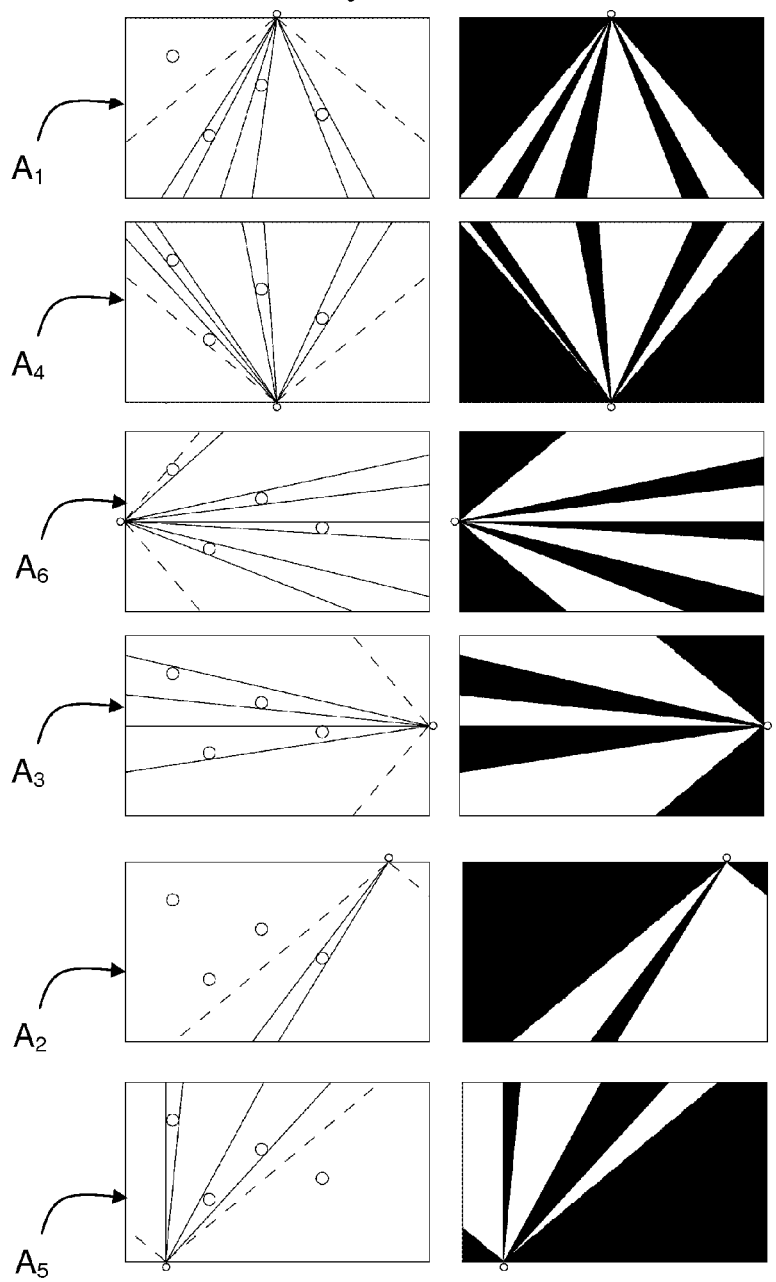
FIG. 8B illustrates corresponding polygon sets.

FIG. 8B illustrates the polygon sets $A_1$-$A_6$ generated based on the spatial transmission signals obtained for the light sheet of the respective emitter e1-e6. Each polygon set $A_1$-$A_6$ comprises attenuation paths corresponding to peaks in the corresponding spatial transmission signal (not shown) as well as dead zones associated with the spatial transmission signal. The dead zones are essentially given by the beam angle of the respective emitter. In the left-hand part of FIG. 8B, full lines indicate the borders of the attenuation paths and dashed lines indicate the borders of the dead zones. In the right-hand part of FIG. 8B, polygons in the polygon sets $A_1$-$A_6$ are represented by dark fields.

Figure 9:
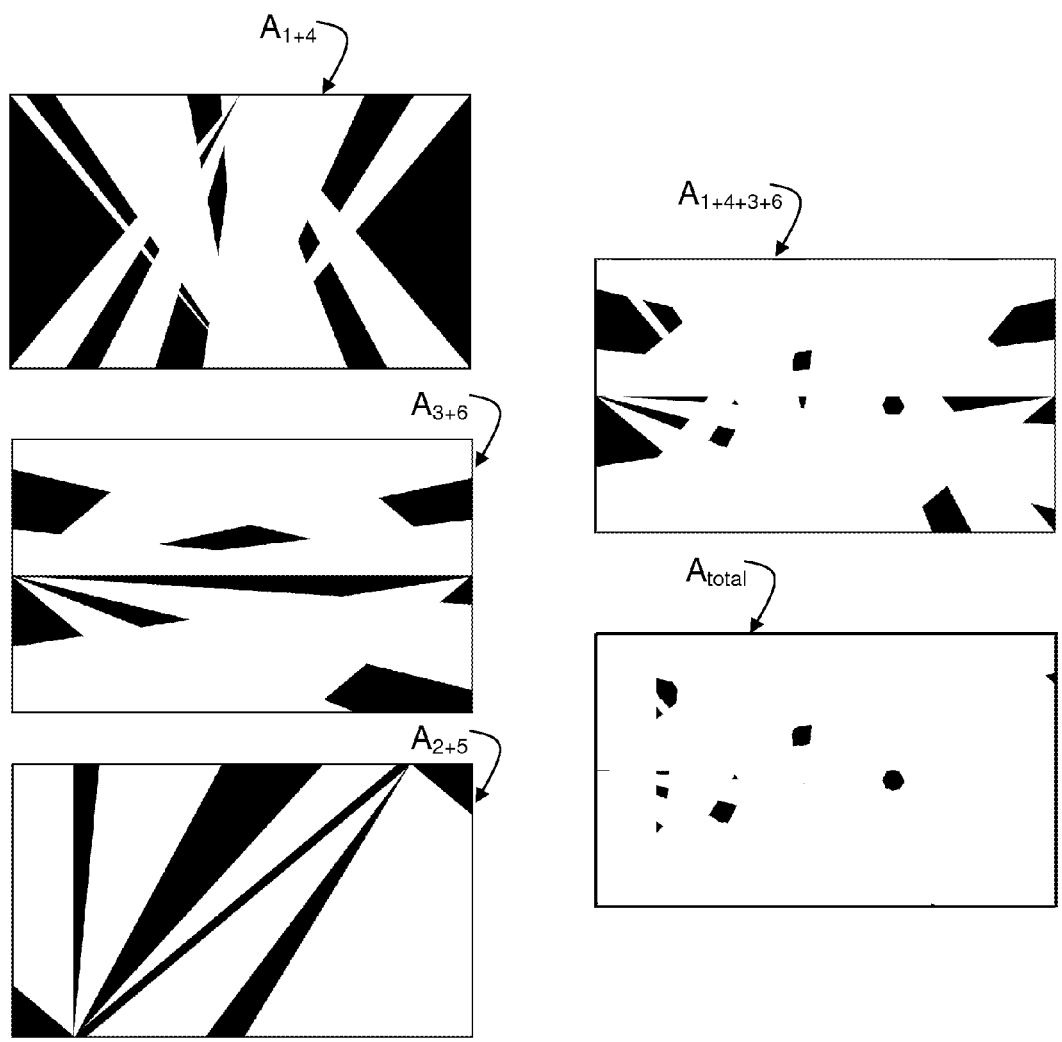
FIG. 9 illustrates polygon intersections and analysis areas obtained by combining the polygon sets in FIG. 8B.

FIG. 9 illustrates the results of intersecting the polygon sets $A_1$-$A_6$ in FIG. 8B. Thus, polygon sets $A_1$ and $A_4$ are intersected to generate polygon intersection $A_{1+4}$, polygon sets $A_3$ and $A_6$ are intersected to generate polygon intersection $A_{3+6}$, and polygon sets $A_2$ and $A_5$ are intersected to generate polygon intersection $A_{2+5}$. Then, polygon intersections $A_{1+4}$ and $A_{3+6}$ are intersected to generate polygon intersection $A_{1+4+3+6}$, which is then intersected with polygon intersection $A_{2+5}$ to generate the final intersection $A_{total}$.

The final intersection $A_{total}$ represents the total area that might contain a touching object. FIG. 9 shows that this area constitutes a minor part of the touch surface. By comparing $A_{total}$ in FIG. 9 with FIG. 8A, it can be seen that, in this particular example, the intersection step results in certain analysis areas that do not correspond to a proper (true) touch point. These analysis areas may be removed in the subsequent reconstruction and touch identification steps (steps 206-207 in FIG. 2). The number of analysis areas may be reduced, for a given number of true touch points, by increasing the number of light sheets that illuminate the panel.

It should be understood that there are many alternatives to the steps for generating and intersecting polygons.

Figure 10A:
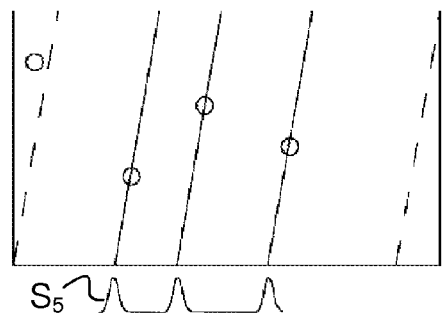
FIGS. 10A-10G illustrate a center line technique for identifying analysis areas.
Figure 10B:
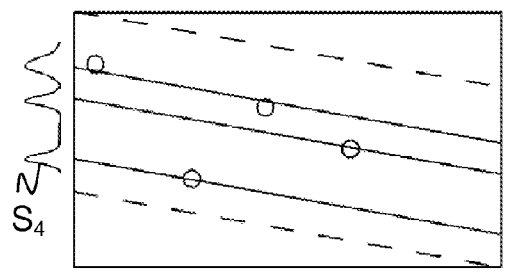
Figure 10C:
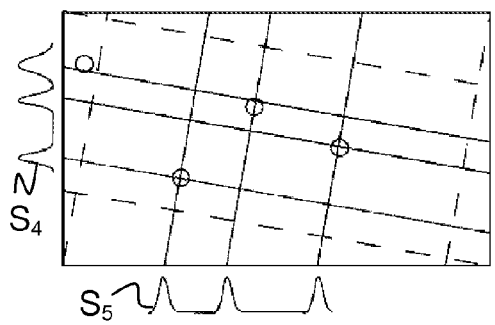
Figure 10D:
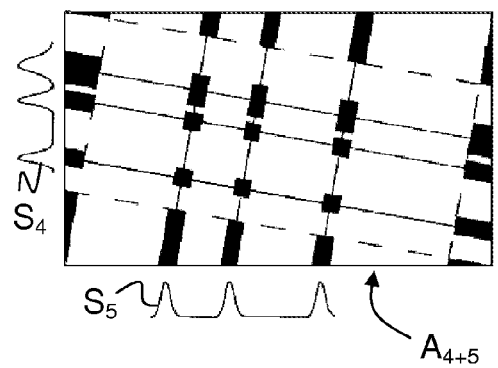
Figure 10E:
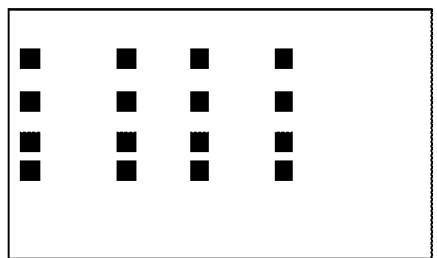
Figure 10F:
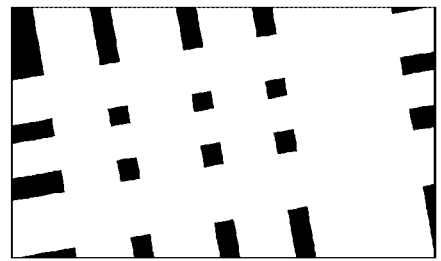
Figure 10G:
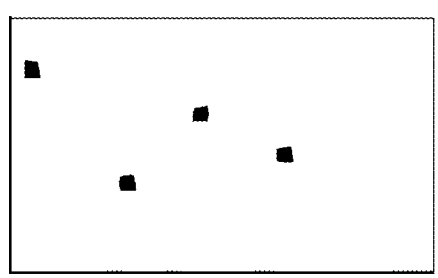

For example, the generation and intersection steps may be interwoven instead of being executed in sequential order. In one such embodiment, denoted "center line intersection", spatial transmission signals are processed in pairs, wherein peak data from each pair is combined to generate a respective polygon set. Such peak data may be the center point $c_{i,j}$ and width $w_{i,j}$ of each peak (cf. FIG. 3A). The resulting polygon sets are then intersected, as described above, to generate a final intersection. The center line intersection technique is further exemplified in FIG. 10. In FIG. 10A, three center lines (full lines) are retraced across the touch panel, based on center points of peaks identified in the spatial transmission signal $S_5$, and with knowledge about the detection lines extending from the outcoupling site at the bottom end of the panel. Furthermore, dead zones are included in the center line representation of FIG. 10A. In FIG. 10B, three center lines (full lines) are retraced across the touch panel, based on center points of peaks identified in the spatial transmission signal $S_4$. It may be noted that two of the objects are essentially aligned with the detection lines and are not separated from each other in the peak identification step. Therefore, a single center line is retraced from the center point of the uppermost peak in FIG. 10B. FIG. 10C illustrates the result of intersecting the center line representations in FIGS. 10A and 10B. In FIG. 10D, polygons have been generated around each crossing of center lines, by retracing the width of the respective peak to the crossing point. Furthermore, polygons are similarly generated in the dead zones. Thus, the polygon set $A_{4+5}$ in FIG. 10D essentially corresponds to a polygon intersection, as described above in relation to FIGS. 6-9. FIGS. 10E and 10F illustrate polygon sets $A_{1+2}$ and $A_{3+6}$, which are generated based on spatial transmission signals $S_1$, $S_2$ and $S_3$, $S_6$, respectively. The polygon sets $A_{4+5}$, $A_{1+2}$ and $A_{3+6}$ in FIGS. 10D-10F are then intersected as described in relation to FIGS. 6-9, to generate the final intersection $A_{total}$ shown in FIG. 10G. The center line intersection technique may benefit from maximizing the orthogonality between detection lines when pairing the spatial transmission signals to generate the initial polygon sets (cf. FIGS. 10D-10F). This may make the location of the crossing points less vulnerable to noise in the spatial transmission signals.

In another variant, the polygon generation step (step 204) is omitted. Instead, step 205 is modified so as to obtain the analysis areas based on a map/image of the touch surface, wherein the map is divided into resolution elements or pixels. For every pixel on the map, it is checked whether the pixel when matched to the respective spatial transmission signal along the associated detection line, falls within a peak or not. The pixel is deemed part of an analysis area if it falls within a peak for all detection lines. It is realized that the algorithm need to keep count of the number of detection lines that are associated with each pixel (with this number being lower if the pixel lies within one or more dead zones).

Yet another variant is based on the use of the above-mentioned polygon sets (generated in step 204), wherein step 205 is modified so as to combine corresponding pixels in all polygon sets in a logical AND operation, whereby the combined pixels are deemed to be part of an analysis area only if all of the combined pixels belong to an attenuation path or a dead zone.

The latter techniques involving a pixel-by-pixel analysis may require more computations than the polygon intersection technique and the center line intersection technique, to achieve a given spatial resolution.

It is to be understood that the center line intersection and pixel-by-pixel analysis techniques may also be used for processing of spatial transmission signals obtained in fan beam embodiments.

In all embodiments involving polygon intersections, it is possible to implement a mechanism for early termination in the absence of analysis areas. Specifically, since the polygon intersections are generated by a logical AND operation, if any polygon intersection ($A_{3+5}$, $A_{4+6}$ etc) is found to be a null set, i.e. be free of polygons, it can be concluded that the final intersection $A_{total}$ also will be a null set. Thus, whenever any of the polygon intersections are found to be a null set, the process may jump directly to step 208 to output a null set of coordinates, and then be ready for a new iteration (see FIG. 2). Such an early-termination mechanism may also check certain polygon sets for null sets, and terminate if a null set is found. This applies to any polygon set that has no dead zones, such as polygon sets $A_1$ and $A_2$ in FIG. 6C. If any of these polygon sets are null sets, the final intersection $A_{total}$ will also be a null set. This is equivalent to terminating whenever the peak detection step (step 203 in FIG. 2) fails to identify any peaks in at least one of the spatial transmission signals $S_1$, $S_2$ obtained for the perpendicular beams B1, B2 (FIG. 4A). In one embodiment, step 203 is configured to process these spatial transmission signals $S_1$, $S_2$ before other spatial transmission signals, and to terminate whenever it fails to find a peak in $S_1$ or $S_2$.

Localized Reconstruction (step 206)

In the reconstruction step, the analysis areas are processed to identify the presence of touch points. The reconstruction step typically involves generating spatial distribution map, which indicates the spatial distribution of energy/attenuation/transmission values within the analysis areas. Such a spatial distribution map can be generated adapting any existing image reconstruction technique that can be used to reconstruct a spatial distribution map across the entire touch surface, to generate spatial distribution map locally within the analysis areas only.

In one example, a standard tomography method such as filtered backprojection may be adapted for localized reconstruction within the analysis areas. The theory of tomographic reconstruction is well-known in the art. It is thoroughly described in text books such as "Mathematical Methods in Image Reconstruction" by Frank Natterer and Frank Wübbeling, and "Principles of Computerized Tomographic Imaging" by Kak and Slaney.

For a thorough description of the filtered backprojection algorithm, as well as the differences in implementation between a setup with parallel detection lines (as obtained in the scan beam embodiments) and a setup with diverging detection lines (as obtained in the fan beam embodiments), we refer to the text books presented above. Here, we will give the rough outline of the major steps in the algorithm, as adapted for localized reconstruction, and show how we can benefit from using the analysis areas.

The filtered backprojection algorithm generally operates on so-called projections, which may correspond to the above-mentioned spatial transmission signals, typically (but not necessarily) converted into transmission or logarithmic transmission (see below). As applied for reconstruction of the complete touch surface, the algorithm would operate to, for each projection:
1. Apply a suitable filter to the projection. Suitable filters are found in the literature, but can for instance be Ram-Lak or Shepp-Logan. The filter can be applied either in the Fourier plane or in the spatial domain.
2. For every point/pixel in the spatial distribution map, a reconstructed signal value is computed as the sum of the pixel's interaction with all the filtered projections; this is the backprojection process.

Figure 11A:
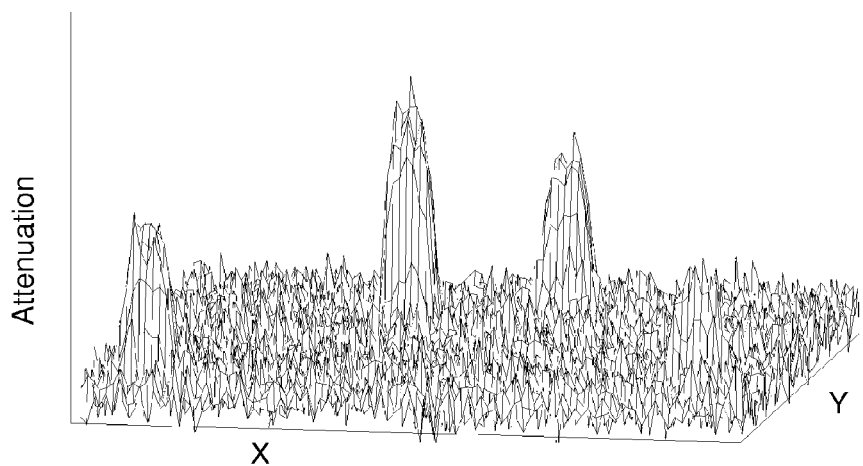
FIG. 11A illustrates a plot of attenuation values resulting from a full reconstruction.

An example of a spatial distribution map generated by such a full reconstruction based on a set of spatial transmission signals is given in the three-dimensional plot of FIG. 11A, which shows reconstructed attenuation values in the XY coordinate system of the touch panel.

Figure 11B:
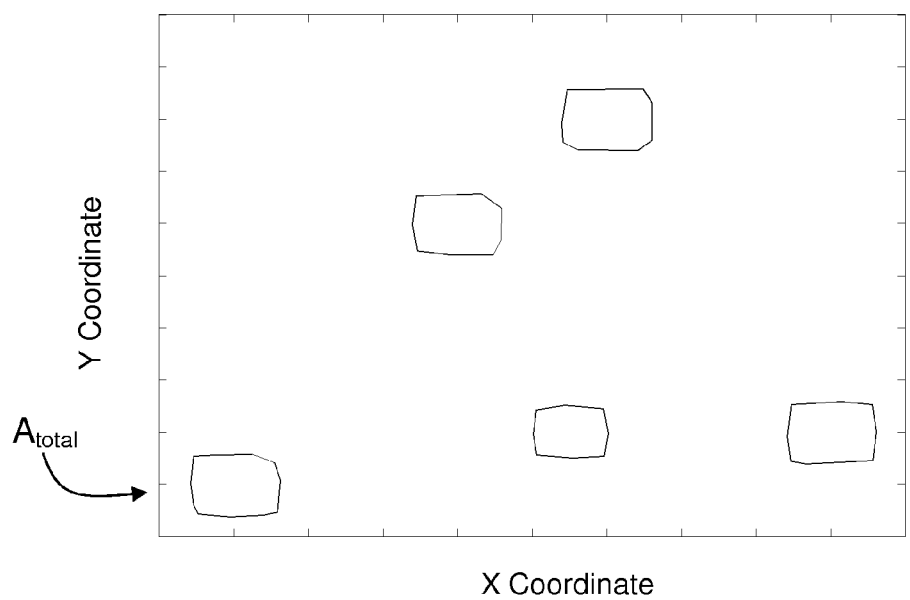
FIG. 11B is a plot of analysis areas identified by polygon intersection.
Figure 11C:
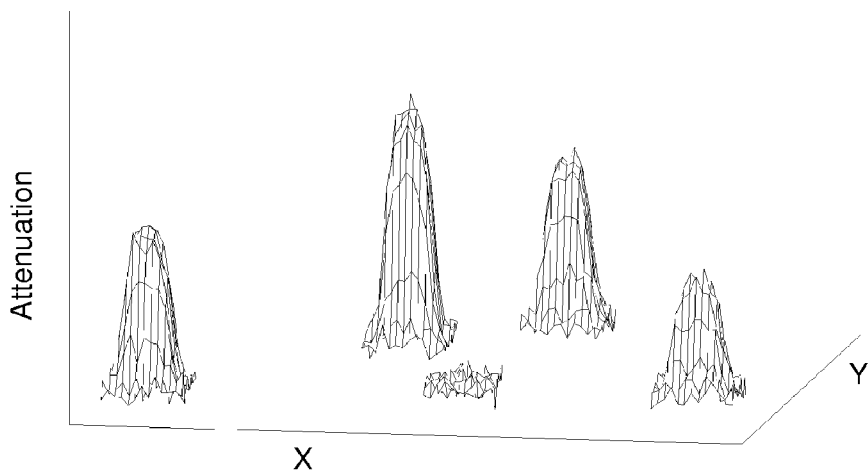
FIG. 11C is a plot of attenuation values resulting from a localized reconstruction.

To adapt the backprojection algorithm for localized reconstruction, step 2 above may be modified so as to not compute the sums for pixels within the entire touch surface plane during the backprojection process, but only for pixels within the analysis areas. FIG. 11B illustrates a final intersection $A_{total}$ computed by polygon generation and intersection (steps 204-205) based on the set of spatial transmission signals used for generating the full reconstruction in FIG. 11A. As shown, the final intersection results in five analysis areas. FIG. 11C illustrates the result of a localized reconstruction within the analysis areas. By comparing FIG. 11A and FIG. 11C, it is seen that the localized reconstruction leads to the same result as the full reconstruction within the relevant parts of the touch panel. It is also seen that by choosing a proper localized reconstruction algorithm it is possible to reduce the noise level. In the filtered backprojection, for instance, the projection signals (i.e. the spatial transmission signals) may be pre-processed for noise reduction before the reconstruction, based on the analysis areas, by setting the attenuation to 0 (or equivalently, transmission to 1) outside the relevant peaks. This pre-processing may be done before applying the above-mentioned filter (e.g. Ram-Lak or Shepp-Logan). Furthermore, the localized reconstruction process is more overdetermined than a full reconstruction, since many unknowns can be removed when the reconstruction is limited to the analysis areas. The skilled person realizes that further noise reduction is possible, by properly designing reconstruction process to make use of the increase in information.

It should be emphasized that the need for processing during the touch determination process is primarily caused by step 2, i.e. the actual reconstruction. For most tomographic reconstruction techniques, the processing scales with the number of projections as well as the number of points (pixels) in the reconstructed image (i.e. the spatial distribution map). The rationale of this can be found in the algorithm outlined above. For every point in the spatial distribution map, we shall add backprojection values from all the projections. When we limit the reconstruction to the analysis areas, we reduce the number of points in the spatial distribution map that we reconstruct. In relation to FIG. 2, it was explained that embodiments of the invention enables a reduced reconstruction processing by a factor of about 44 for ten touches on a 40-inch touch panel. If there are four touches on the same touch panel, the processing can be reduced by a factor of ~275, and if there are only two touches on the panel, the processing is reduced by at least a factor of ~1100.

It should be emphasized that the localized reconstruction is not limited to the use of the filtered backprojection algorithm. In essence any existing image reconstruction technique may be used, including but not limited to CT (Computed Tomography), ART (Algebraic Reconstruction Technique), SIRT (Simultaneous Iterative Reconstruction Technique), SART (Algebraic Reconstruction Technique), Direct 2D FFT reconstruction, or a statistical reconstruction method, e.g. based on Bayesian inversion. Embodiments of techniques for image reconstruction are further disclosed in Applicant's U.S. provisional application No. 61/272,667, filed on Oct. 19, 2009, and U.S. provisional application No. 61/282,973, filed on May 3, 2010, which are both incorporated herein by reference.

A general advantage of the localized reconstruction is that it makes it possible to distinguish between true and false touch points among the analysis areas, in the subsequent touch identification step 207. Thus, if any fully or partially overlapping peaks are not identified and separated in step 203, such peaks will result in plural analysis areas in step 205, which after reconstruction in step 206 are processed in step 207 for identification of true touch points.

Touch Identification and Data Extraction (Steps 207-208)

After completion of the localized reconstruction step 206, any known technique may be used for isolating true (actual) touch points within the spatial distribution map. For example, ordinary blob detection and tracking techniques may be used for finding the actual touch points. It should be realized, though, that the preceding local reconstruction step reduces the processing needed for extracting the touch points.

In one embodiment, a threshold is first applied to the spatial distribution map, to remove noise. Any areas that rise above the threshold, may be further processed to find the center and shape by fitting for instance a two-dimensional Gaussian bell shape to the signal values within the area, or by finding the weighted ellipse of inertia of the signal values within the area. There are also numerous other techniques as is well known in the art, including but not limited to fitting two-dimensional second-order polynomial, K-means clustering, Laplacian of Gaussian (LoG), and Watershed algorithm.

The spatial distribution map may be processed to extract any type of touch data. Such touch data may include the coordinates of each touching object within the coordinate system of the touch surface. Other types of touch data include area and/or shape of each touching object. Since the area is a function of applied pressure, at least for flexible objects (e.g. fingertips), the contact pressure between the object and the touch surface may also be estimated for each touching object.

Still further, the step 208 may refrain from outputting touch data for certain objects, e.g. based on their area and/or shape. For example, it may be desirable not to output touch data for a palm of a hand, whereas touch data for fingertips should be output.

In a further embodiment, any touch points that are detected in the spatial distribution map are matched to touches that were detected in a preceding iteration (cf. iteration in FIG. 2). For many applications, it may be useful to know that a touch point is part of a time-sequence of touch points. This may, e.g., facilitate recognition of touch gestures on the touch surface, etc.

As mentioned above, the localized reconstruction step 206 may be omitted, and the touch identification step 207 may operate directly on the analysis areas that are identified in step 205. Such a variant is particularly plausible whenever the number of possible touch points is limited and less than the number of intersecting light sheets in the panel. For example, true touch points may be distinguished from false touch points among the analysis areas based on the shape and/or size of the analysis areas, provided that the shape and/or area of the touching objects is known or predictable.

Figure 12A:
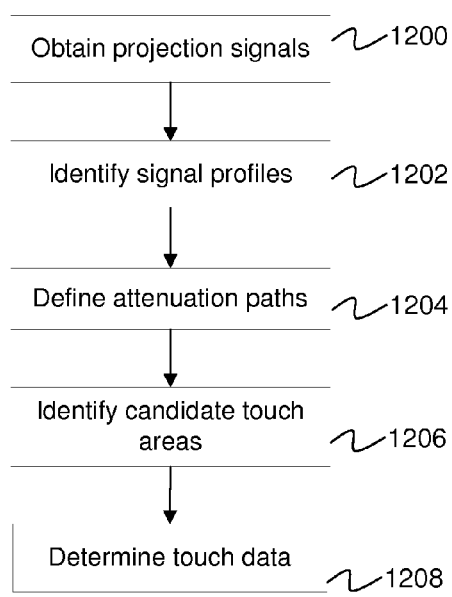
FIGS. 12A-12B are flowcharts of exemplifying methods for determining touch locations.

FIG. 12A illustrates one embodiment of such a method for touch determination in a touch-sensing apparatus as described herein. The method involves obtaining one or more projection signals, each being indicative of a spatial distribution of light within an outcoupling site of the touch-sensing apparatus (step 1200), and processing the projection signal(s) for identification of all signal profiles representing an attenuation caused by one or more touching objects (step 1202). The method further involves determining, for each signal profile, an attenuation path across the touch surface (step 1204), and identifying, as a function of a set of thus-determined attenuation paths, one or more candidate touch areas on the touch surface, wherein each candidate touch area is a subset of the touch surface (step 1206). The method is concluded by determining touch data for each touching object, based on the candidate touch areas (step 1208).

Figure 12B:
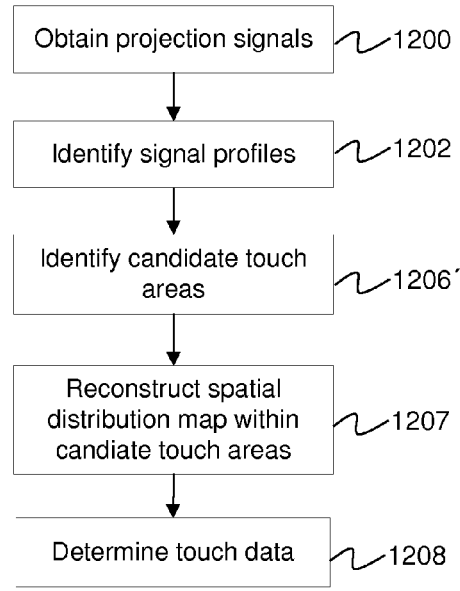

FIG. 12B illustrates another embodiment of a method for touch determination in a touch-sensing apparatus as described herein. The method in FIG. 12B involves obtaining one or more projection signals (step 1200), and identifying signal profiles in the projection signal(s) (step 1202). The method further involves identifying, based on the signal profiles, one or more candidate touch areas on the touch surface (step 1206'), and processing the projection signal(s) to reconstruct a two-dimensional distribution of signal values within the candidate touch area(s) (step 1207). The method is concluded by determining touch data for each touching object, based on the candidate touch areas (step 1208).

Figure 13A:
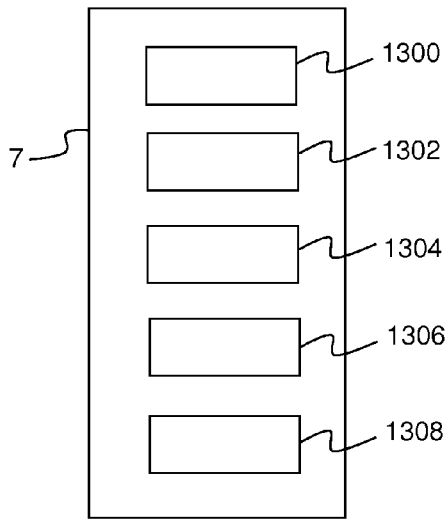
FIGS. 13A-13B are block diagrams of devices for determining touch locations.

The touch determination process is typically executed by a data processing device (cf. 7 in FIG. 1A) which is connected to receive the output signal(s) of the light sensor(s) in the touch-sensing apparatus. FIG. 13A shows an example of such a data processing device 7 for executing the process in FIG. 12B. In the illustrated example, the device 7 includes an element (or means) 1300 for obtaining one or more projection signals, and an element (or means) 1302 for processing the projection signal(s) for identification of all signal profiles representing an attenuation caused by one or more touching objects. There is also provided an element (or means) 1304 for identifying, based on the signal profiles, one or more candidate touch areas on the touch surface, and an element (or means) 1306 for processing the projection signal(s) to reconstruct a two-dimensional distribution of signal values within the candidate touch area(s). The device 7 further includes an element (or means) 1308 for determining touch data for each touching object, based on the candidate touch areas.

Figure 13B:
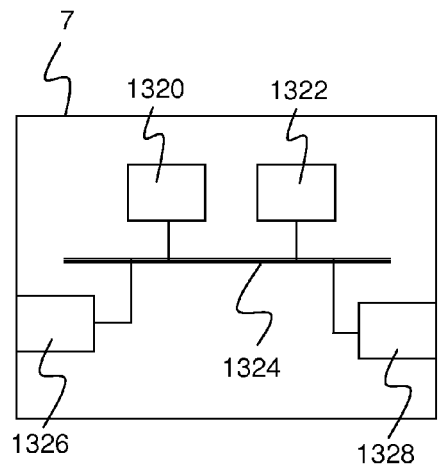

The device 7 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. As indicated in FIG. 13B, such a software controlled computing device 7 may include one or more processing units 1320, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The computing device 7 may further include a system memory 1322 and a system bus 1324 that couples various system components including the system memory 1322 to the processing unit 1320. The system bus 1324 may be any of several types of bus structures including a memory bus or memory controller, a peripheral bus, and a local bus using any of a variety of bus architectures. The system memory 1322 may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The computing device 7 may include one or more communication interfaces 1326, such as a serial interface, a parallel interface, a USB interface, a wireless interface, a network adapter, etc, as well as one or more data acquisition devices 1328, such as an A/D converter. The special-purpose software may be provided to the computing device on any suitable computer-readable medium, including a record medium, a read-only memory, or an electrical carrier signal.

In all of the above embodiments, the emitters can operate in any suitable wavelength range, e.g. in the infrared or visible wavelength region. All sheets of light could be generated with identical wavelength. Alternatively, different sheets could be generated with light in different wavelength ranges, permitting differentiation between the sheets based on wavelength. Furthermore, the emitters can output either continuous or pulsed radiation. Still further, the emitters may be activated concurrently or sequentially. Any type of emitter capable of emitting light in a desired wavelength range could be used, for example a diode laser, a VCSEL (vertical-cavity surface-emitting laser), or an LED (light-emitting diode), an incandescent lamp, a halogen lamp, etc.

The transmitted energy may be measured by any type of light sensor capable of converting light into an electrical signal. It should be noted that in the context of this specification, a "light sensor" implies a 0-dimensional light detector. Thus, the light sensor 3 (FIG. 1B) may be a single light sensing element such as a photo-detector or a pixel on a CCD or CMOS detector. Alternatively, the light sensor 3 may be formed by a group of light sensing elements that are combined for 0-dimensional light detection, by summing/averaging the output of the individual elements in hardware or software.

The light transmissive panel 1 may be made of any material that transmits a sufficient amount of light in the relevant wavelength range to permit a sensible measurement of transmitted energy. Such material includes glass, poly (methyl methacrylate) (PMMA) and polycarbonates (PC). The panel 1 may be made of a single material or may be formed by layers of different materials. The internal reflections in the touch surface are caused by total internal reflection (TIR), resulting from a difference in refractive index between the material of the panel and the surrounding medium, typically air. The reflections in the opposite boundary surface may be caused either by TIR or by a reflective coating applied to the opposite boundary surface.

Normalization of Output Signals

As noted above, a spatial transmission signal may be obtained through normalization with a background signal. The background signal typically represents the transmitted energy with no objects touching the panel, and thus indicates the spatial distribution of light at the respective outcoupling site. The background signal may or may not be unique to each detector/outcoupling site or each output signal. The background signal may be pre-set, derived during a separate calibration step, or derived from output signals (without any objects touching the panel) acquired during one or more preceding iterations, possibly by averaging a set of such output signals.

Figure 14A:
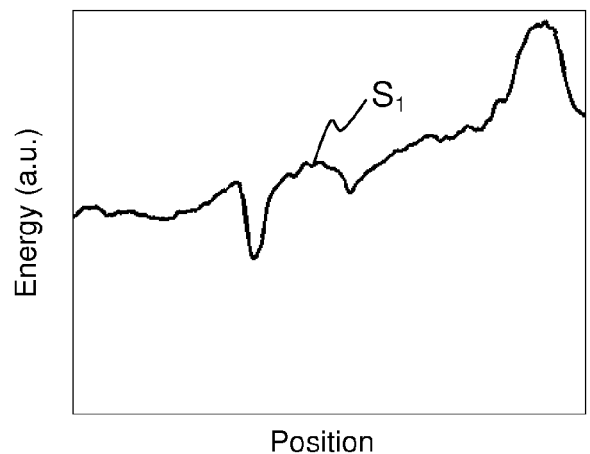
FIGS. 14A-14C are plots of a projection signal, a background signal and a transmission signal, respectively, as a function of position within an outcoupling site, for a situation with one touching object.
Figure 14B:
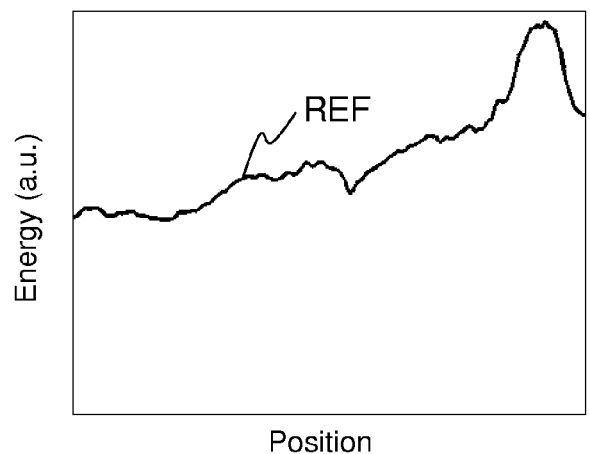
Figure 14C:
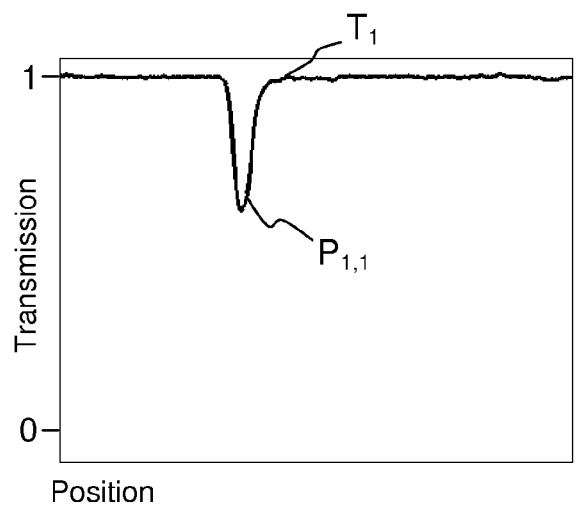

To further exemplify such calculation of a spatial transmission signal, FIG. 14A shows non-normalized spatial transmission signal $S_1$ obtained with a single object touching the panel, given as a plot of transmitted energy as a function of position within the outcoupling site. FIG. 14B shows a corresponding background signal REF, also given as a plot of transmitted energy as a function of position within the outcoupling site. In this example, the distribution of radiation is highly non-uniform within the outcoupling site. FIG. 14C shows the resulting normalized spatial transmission signal $T_1 = S_1/REF$, which results in a essentially uniform signal level at a (relative) transmission of about 1 with a peak $P_{1,1}$ caused by the touching object. It is to be understood that the conversion into normalized spatial transmission signals greatly facilitates the identification of relevant peaks. It also makes it possible to compare peaks in signals obtained at different outcoupling sites and/or for different beams. In a variant, the spatial transmission signals are converted to represent attenuation instead of transmission, given by $1-T_1$.

As mentioned above, if there are more than two touch points on the same detection line, the total transmission signal is the product of individual transmissions of the touch points. This is true for any number of objects on any detection line, provided that a remainder of the beam reaches the outcoupling point (and the sensor). Thus, by operating on normalized spatial transmission signals, it is possible to separate the contribution from individual touching objects to a peak in a spatial transmission signal.

The skilled person realizes that the touch determination may be simplified by operating on logarithms (in any base), since the logarithm of the total transmission along a detection line is then equal to the sum of the logarithms of the individual transmissions of the touch points on that detection line. Furthermore, by operating on logarithms the normalization may be carried out by a subtraction operation rather than a division operation: $\log(T_1)=\log(S_1)-\log(REF)$. However, logarithms need not be used.

Use of Dispersion

The present Applicant has realized that the touch determination may be improved by designing the touch determination process to take the effects of light scattering into account.

The light scattering may be caused by a diffusing surface structure, also called an anti-glare (AG) structure, on the touch surface 4. An AG structure may be used to reduce glares from external lighting on the touch surface. Further, when the touching object is a naked finger, the contact between the finger and the touch surface normally leaves a fingerprint on the touch surface. On a perfectly flat surface, such fingerprints are clearly visible and usually unwanted. By adding an AG structure to the touch surface, the visibility of fingerprints is reduced. Furthermore, the friction between the finger and the touch surface decreases when an AG structure is used, which may thus improve the user experience. AG structures are specified in gloss units (GU), where lower GU values result in less glares.

When a beam of light propagates by internal reflection in a light transmissive panel that has an AG structure on one or both of its boundary surfaces, each internal reflection against such a scattering boundary surface will cause some light to be diverted away from the main direction of the beam and may also cause radiation to escape through the boundary surface.

Light scattering may have other causes, e.g. other types of coatings, layers or surface structures on the light transmissive panel, defects or imperfections in the panel or in the associated optical components, contaminations (fingerprints, dust, etc) on the boundary surfaces of the panel, diffractive effects within the touch-sensing apparatus, etc.

Figure 15A:
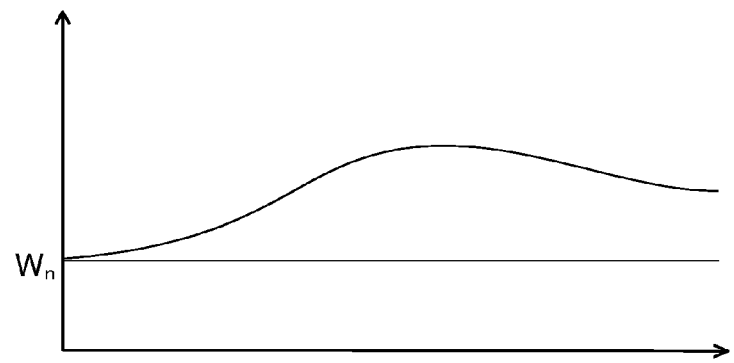
FIGS. 15A-15B are graphs of dispersion functions caused by scattering in a touch-sensing apparatus.

Irrespective of origin, the present Applicant has found that light scattering generally causes the beam to be broadened in the plane of the panel as the beam propagates from its entry point(s) on the panel. This broadening causes the shape of the touch signature in the spatial transmission signal to depend on the location of the touching object on the panel, specifically the distance between the touching object and the relevant incoupling/entry point. FIG. 15A illustrates an exemplifying dependence between the width of the touch signature caused by a touching object and the distance between the touching object and the entry point. The factual width of the touching object is W. When the touching object is located close to the entry point, the detected touch signature will be distinct and have a width similar to the factual width. As the touching object is moved away from the entry point, the detected touch signature will gradually broaden. Close to the outcoupling point, the width of the touch signature may again become slightly smaller. It is to be understood that the actual functional dependence between width and touch location is greatly dependent on the actual optical design of the touch-sensing apparatus, and that FIG. 15A is merely given as an example.

Figure 15B:
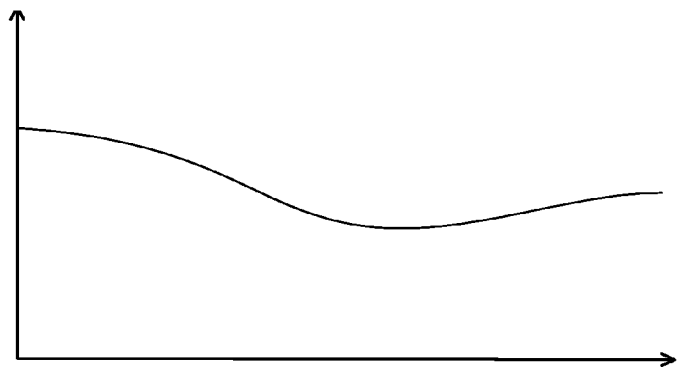

In FIG. 15A, it can be seen that a small touching object located centrally between the entry and outcoupling points will yield the same touch signature width as a larger touching object located closer to the entry point. Based on the data in FIG. 15A, it is possible to determine the factual width of a touching object that yields a certain touch signature width, as a function of the distance between the touching object and the entry point. This type of functional dependence is denoted dispersion function in the following. FIG. 15B is a graph of a dispersion function determined for the data in FIG. 15A. Thus, FIG. 15B illustrates the factual object width at different locations that will generate the same touch signature width in the spatial transmission signal. As will be further explained in the following, such a dispersion function can be used to improve the touch determination process.

The origin of the dispersion function will now be further explained in relation to the scan beam embodiment of FIG. 1C. To understand the behavior of a specific touch-sensing apparatus, it is necessary to analyze its optical design. The shape of the diverging set of rays from the entry point depends on many different factors, e.g. panel thickness, internal angle of incidence onto the boundary surfaces, AG structure, etc. The resulting touch signature depends, apart from the diverging set of rays, on a number of other factors, e.g. detector surface area, detector numerical aperture, cross-section of injected light, etc. When beams are swept parallel to the edges of the panel, detector-specific parameters typically have more impact on the touch signature for touch locations close to the outcoupling point. Conversely, emitter-specific properties mainly affect the touch signature for touch locations close to the entry point.

Figure 16A:
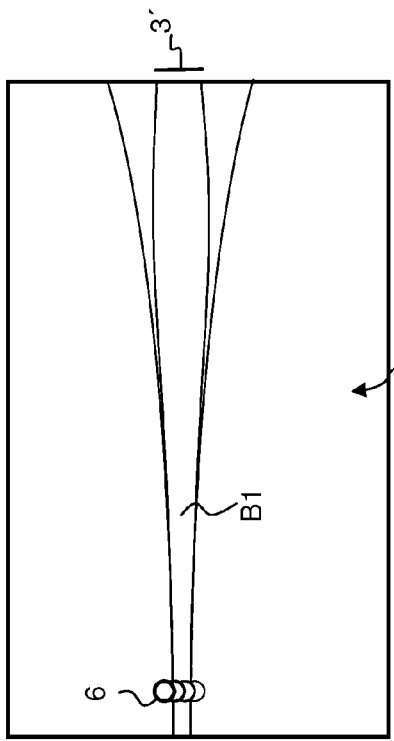
FIGS. 16A-16D are top plan views of a beam propagating inside a light transmissive panel, serving to illustrate the origin of the dispersion functions in FIGS. 15A-15B.

As explained above, a beam of light that is transmitted through the panel will be broadened by light scattering phenomena. FIG. 16A is a plan view of the panel 1 in which a beam B1 is injected at an entry side and propagates to an outcoupling side. At the outcoupling side, the energy of the beam B1 is sensed within a confined area (indicated by 3' and denoted "receiving area" in the following). The length of the receiving area 3' is dependent on the numerical aperture of the light sensor arrangement (e.g. the output scanner arrangement 9 in FIG. 1C), i.e. the range of angles over which the light sensor arrangement can accept light.

As shown in FIG. 16A, the beam B1 diverges as it propagates through the panel. Since the receiving area 3' has a finite length, it will only receive the central parts of the diverging beam B1 that reaches the outcoupling side. FIG. 16B indicates the outer rays that reach the receiving area 3'.

Figure 16C:
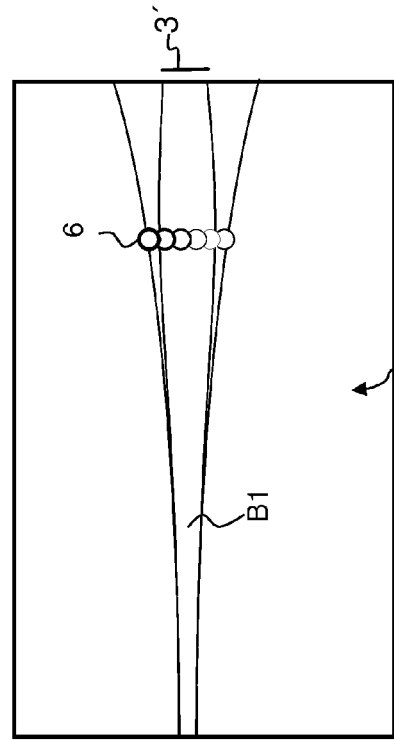
Figure 16B:
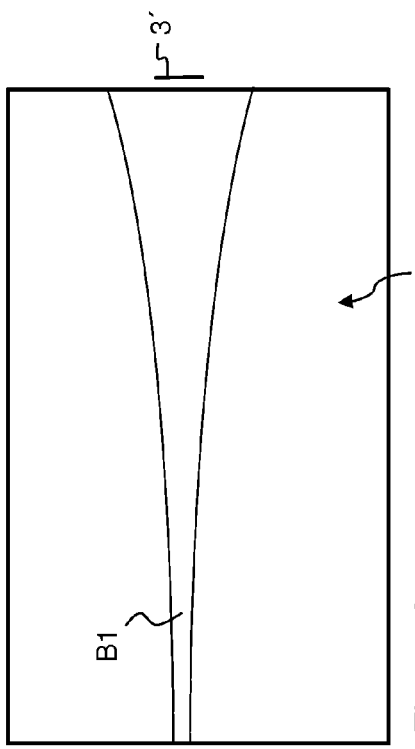

FIG. 16C illustrates the situation when an object 6 touches the panel 1 close to the entry side, in this example the left side. For simplicity, we consider a touching object 6 that moves with respect to the beam B1, but the conclusions will be equally applicable for a stationary touching object and a moving beam (as in the scan beam embodiment). Four different locations of the touching object 6 are shown in the left-hand part of FIG. 16C. Clearly, the touching object 6 interacts with the beam B1 over a short distance. FIG. 16C also indicates that the touching object 6 interacts with a large part of the beam B1. Thus, the resulting touch signature will be narrow (small width) and strong (low transmission).

Figure 16D:
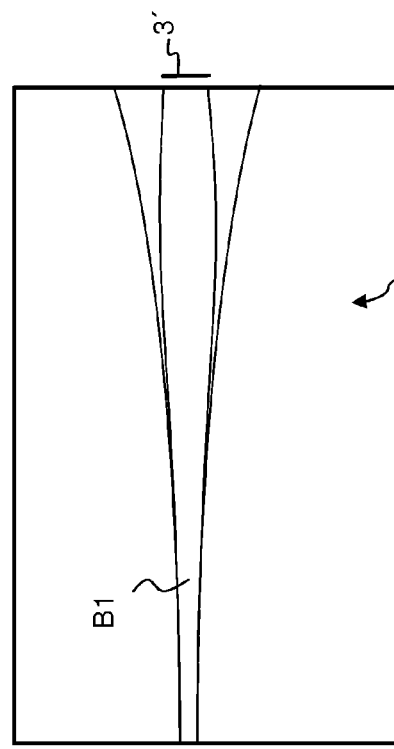

FIG. 16D illustrates the situation when the object 6 touches the panel 1 further away from the entry side. Clearly, the touching object 6 interacts with the beam B1 over a longer distance. It is also seen that the touching object 6 interacts with a smaller portion of the beam B1. Therefore, the resulting touch signature will be wider and weaker.

In the example of FIG. 16, the width of the touch signature will decrease slightly for locations to the right of the touching object 6 in FIG. 16D. Such signature behavior is also illustrated in the graph of FIG. 15A. It should be noted that such a decrease in signature width is only observed when the length of the receiving area 3' is smaller than the width of the dispersed beam at the outcoupling side (e.g. as shown in FIG. 16A). For example, in the above-mentioned variant where a single elongate sensor is arranged at the outcoupling side instead of the output scanner arrangement, a decrease in touch signature width is unlikely to be observed.

Above, it was shown that the width and height of a touch signature changes with the location of the touching object due to the effects of light scattering. Below, it will now be explained how the resulting dispersion function can be used to improve the touch determination. For reasons of explanation, the dispersive effects are slightly exaggerated in the figures accompanying the following disclosure.

Figure 17A:
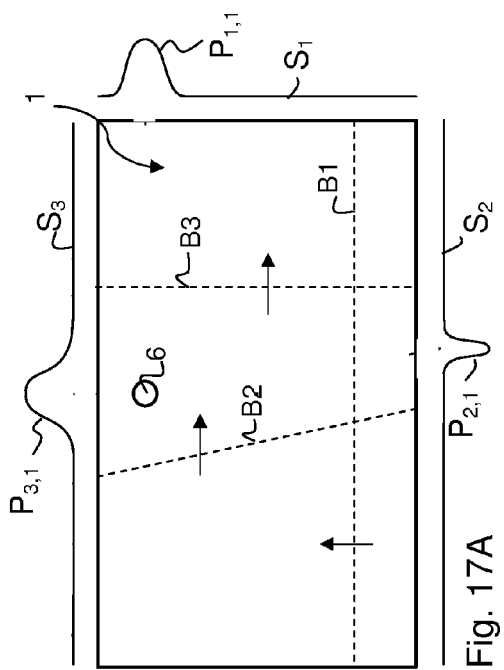
FIGS. 17A-17B are top plan views of a scan beam embodiment, to illustrate a generation of attenuation paths.
Figure 17B:
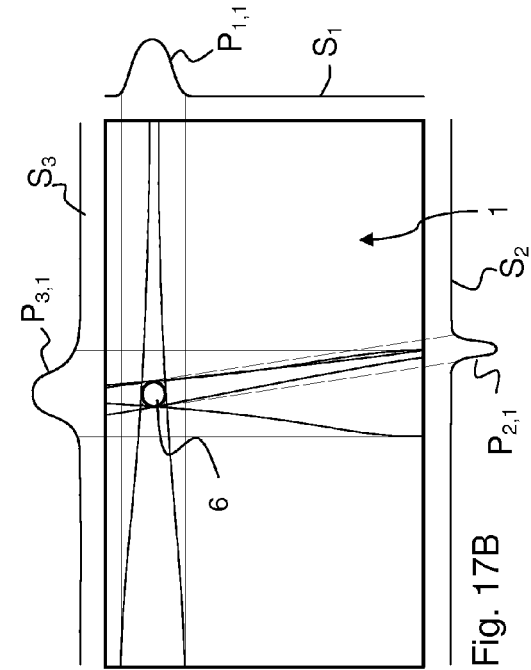

FIGS. 17A-17B illustrate a scan beam embodiment, in which three collimated non-parallel beams are swept (translated) across the panel, resulting in three spatial transmission signals.

FIG. 17A illustrates the three beams B1-B3 and the resulting spatial transmission signals $S_1$-$S_3$. A first beam B1, which is parallel to the top and bottom edges of the panel 1, is injected at the left side and detected at the right side of the panel 1, while being swept from the bottom to the top (or vice versa). The resulting spatial transmission signal $S_1$ is shown to the right side of the panel 1. A second beam B2, with a scan angle which is non-parallel to the edges of the panel 1, is injected at the top and is detected at the bottom, while being swept from left to right (or vice versa). The resulting spatial transmission signal $S_2$ is shown at the bottom. A third beam B3, which is parallel to the left and right edges of the panel 1, is injected at the bottom and detected at the top, while being swept from left to right (or vice versa). The resulting spatial transmission signal $S_3$ is shown at the top. Each spatial transmission signal $S_1$-$S_3$ contains a respective touch signature $P_{1,1}$, $P_{2,1}$, $P_{3,1}$, resulting from the touching object 6.

FIG. 17B illustrates attenuation paths for the touch signatures $P_{1,1}$, $P_{2,1}$, $P_{3,1}$, in the spatial transmission signals $S_1$-$S_3$ generated by the beams B1-B3, as obtained by applying a dispersion function to the width of each touch signature $P_{1,1}$, $P_{2,1}$, $P_{3,1}$. The dispersion function may be determined for this scan beam embodiment, either by theoretical calculation or by measurement. Thus, each attenuation path is delimited by two dispersion lines representing the factual width of a touching object 6 yielding the detected touch signature width as a function of the distance from the entry point. It is seen that if the touching object 6 is located close to the entry point, the factual width is essentially equal to the width of the touch signature. If the touching object 6 is located farther away from the entry point, its factual width has to be smaller in order to generate the detected touch signature $P_{1,1}$. For reference purposes, FIG. 17B also illustrates the uncorrected attenuation paths (straight parallel lines) generated by tracing the limit points the touch signatures $P_{1,1}$, $P_{2,1}$, $P_{3,1}$ along the associated detection lines.

It is realized that a dispersion function may be applied to increase the accuracy of the polygon sets described above and exemplified in relation to FIGS. 5-7 and 10, by using corrected attenuation paths in the polygon sets. Likewise, in center line intersection (FIG. 10), the dispersion function may be applied to determine the factual width at the crossing points. Furthermore, in all embodiments, the dispersion function may also be applied to modify the extent of dead zones. The application of the dispersion function, in a scan beam embodiment with a dispersive touch surface, may result in smaller/fewer analysis areas, and thus may improve the accuracy of the touch determination as well as reduce the required processing and/or improve the processing speed.

Generally, the dispersion function is given by a non-linear curve, and thus the corrected attenuation paths are generally not defined by a polygon. Thus, when applying a dispersion function, and otherwise, the above-mentioned polygon set may actually comprise any form of mathematically defined regions, not only polygonal regions. Thus, in a general sense, the polygon set is to be regarded as only one example of the "path map", which is generated to represent attenuation paths and, if present, dead zones. Generally, the attenuation paths, dead zones and intersections could be represented by non-polygonal geometrical objects, such as circles, ellipses, combinations of spline curves, etc. However, to facilitate the intersection process, it may be advantageous to approximate each attenuation path and dead zone by a polygon, preferably a convex polygon. For example, the borders of the corrected attenuation paths and dead zones may be approximated by straight lines.

The dispersion function can be applied similarly to generate corrected attenuation paths in fan beam embodiments. One difference compared to the scan beam embodiments is that the fan beam generally originates from a smaller incoupling site and expands in the plane of the panel even in the absence of light scattering. Thus, in a fan beam embodiment, the touch signatures contain information about the distance between the entry point and the touching object, even if the panel is essentially free of light scattering. However, the presence of light scattering causes the fan beam to broaden in the plane of the panel while propagating from the incoupling site towards the outcoupling site. Thus, a dispersion function can be measured or calculated for a specific fan beam embodiment. The basic principle for applying the dispersion function is the same as in the scan beam embodiments. This will be further explained with reference to FIGS. 18A-18B.

Figure 18A:
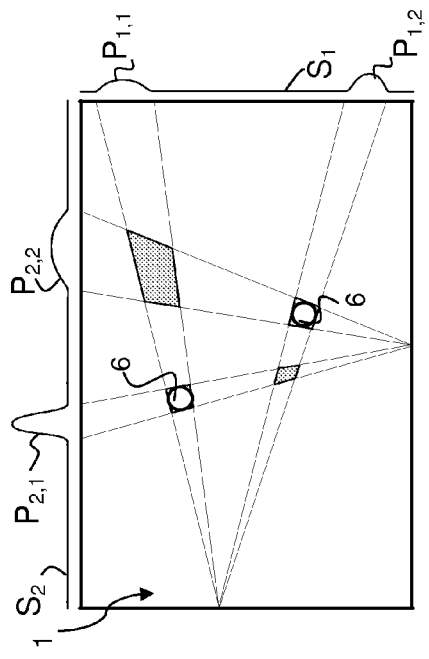
FIGS. 18A-18B are top plan views of a fan beam embodiment, to illustrate a generation of attenuation paths.
Figure 18B:
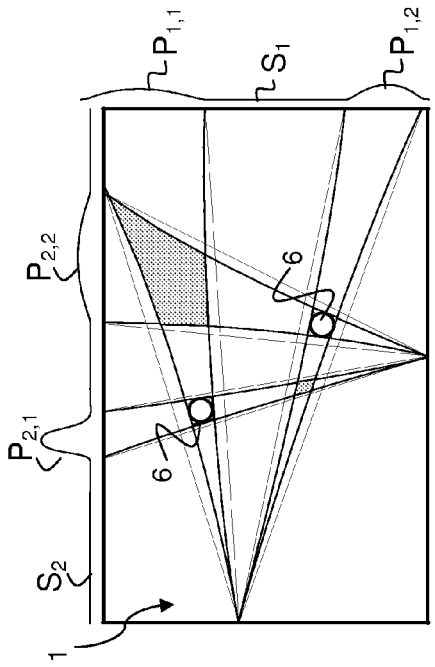

In the example of FIGS. 18A-18B, the panel is internally illuminated by two fan beams. Although not shown on the drawings, several sensors are arranged at two sides of the panel to measure the transmitted energy of the sheets of light formed by the fan beams.

FIG. 18A illustrates a touch-sensing apparatus which is essentially free of light scattering phenomena. The thin lines indicate the boundaries of the light cones from two different emitters (not shown) that interact with two touching objects 6. It should be noted that although the light cones are drawn as if they originate from a singularity (i.e. a single incoupling point), in practice they generally originate from an extended incoupling site that may include more than one incoupling point for the decoding process. FIG. 18A also illustrates the attenuation paths that are obtained from the resulting touch signatures $P_{1,1}$, $P_{1,2}$, $P_{2,1}$, $P_{2,2}$ in the transmission signals $S_1$, $S_2$.

FIG. 18B illustrates the spatial transmission signals $S_1$, $S_2$ obtained in the touch-sensing apparatus of FIG. 18A in the presence of light scattering phenomena, e.g. if at least one of its boundary surfaces is provided with an AG structure. Compared to FIG. 18A, FIG. 18B shows that the touch signatures $P_{1,1}$, $P_{1,2}$, $P_{21}$, $P_{2,2}$ have become wider and slightly weaker as a result of the light scattering. FIG. 18B indicates the light cones (in thin lines) that interact with the objects 6, as well as the corrected attenuation paths (in thicker lines), which are obtained by applying the appropriate dispersion function to the touch signatures $P_{1,1}$, $P_{1,2}$, $P_{2,1}$, $P_{2,2}$ in the transmission signals $S_1$, $S_2$.

It is thus realized that, in presence of light scattering in a fan beam embodiment, a dispersion function may be applied to improve the touch determination process in the same way as in the scan beam embodiment.

Obtaining the Dispersion Function

Figure 19:
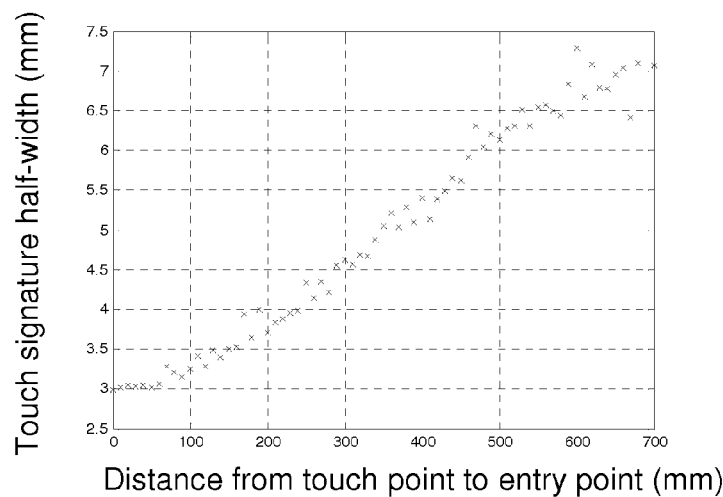
FIG. 19 is a graph of a dispersion function based on measurement data.

As mentioned above, the dispersion function can be obtained by either theoretical calculations for a specific touch-sensing apparatus or by measurements. FIG. 19 is a graph of measurement data obtained from a scan beam embodiment of the type shown in FIG. 1C, wherein the measurement data has been obtained for a rectangular light transmissive panel with a 37 inch diameter. The graph shows the measured half-width of the touch signature as a function of the distance between the entry point (e.g. located on the left side of the panel in FIG. 1C) and the touching object. Thus, this graph corresponds to the graph in FIG. 15A. The touch signature width is clearly dependent on the distance from the entry point (and also on the distance to the outcoupling point). In this particular example, there is no decrease in touch signature width when the touching object is located close to the outcoupling point. The dispersion function may be given by the actual measurement data, suitably after recalculation into a function as shown in FIG. 15B, or the dispersion function may be derived based on a suitable function that is fitted to the measurement data. Such a fitted function may be linear, polygonal, spline, etc It should also be noted that a corresponding dispersion function can be measured without any difficulty in a fan beam embodiment.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, it is not necessary to account for dispersion in the determination of the analysis areas (step 205), even if the touch-sensing apparatus includes significant light scattering phenomena, such as an AG structure. Ignoring dispersion in step 205 will generally result in larger analysis areas, and may thus lead to an increased need for processing in the localized reconstruction step. However, even if dispersion is ignored, a significant decrease in processing is obtained compared to a full reconstruction.

Furthermore, the invention is not limited to the fan beam and scan beam embodiments disclosed herein. It should be realized that the invention is applicable to any FTIR-based touch-sensing apparatus that generates at least one projection signal to be processed for determination of touch data. An example of an alternative touch-sensing apparatus is found in Applicant's PCT application No. PCT/SE2010/000135, filed on May 14, 2010. Here, sheets of light are injected into the panel at elongate incoupling sites and collected via elongate outcoupling sites opposite to the incoupling sites, wherein each sheet of light is essentially collimated in the plane of the panel along a respective main direction.

The invention claimed is:

1. A method for determining touch data in a touch-sensing apparatus, said apparatus including a light transmissive panel that defines a touch surface and an opposite surface, a light source arrangement for providing sheets of light inside the panel, wherein each sheet includes light that propagates by internal reflection between the touch surface and the opposite surface from an incoupling site to an outcoupling site, said apparatus further including a light sensor arrangement for detecting light reaching the outcoupling site, wherein the touch-sensing apparatus is configured such that one or more objects touching the touch surface causes a local attenuation of at least two sheets of light, said method comprising:
    obtaining at least one projection signal which is indicative of a spatial distribution of light within said outcoupling site;
    processing said at least one projection signal for identification of signal profiles representing said attenuation;
    identifying, based on the signal profiles, one or more candidate touch areas on the touch surface;
    processing, after identifying the one or more candidate touch areas, said at least one projection signal to reconstruct a two-dimensional distribution of signal values only within said one or more candidate touch areas, the two-dimensional distribution of signal values being a two-dimensional image of signal energy attenuation values associated with the at least one projection signal; and
    determining touch data for the or each object by processing the reconstructed signal values within the candidate touch areas.

2. The method of claim 1, wherein the identifying comprises:
    determining, for each signal profile, an attenuation path across the touch surface, wherein the attenuation path has a width which is determined based on the signal profile; and
    identifying, as a function of a set of thus-determined attenuation paths, said one or more candidate touch areas on the touch surface.

3. The method of claim 2, wherein the identifying comprises intersecting the attenuation paths.

4. The method of claim 3, wherein:
    the obtaining includes,
        obtaining a plurality of projection signals, each projection signal being associated with a set of dead zones on the touch surface, in which the projection signal is insensitive to objects touching the touching surface; and
    the identifying further includes,
        intersecting the attenuation paths with the dead zones.

5. The method of claim 2, wherein:
    the obtaining includes,
        obtaining a plurality of projection signals; and
    the identifying includes,
        generating, for each projection signal, a path map which represents the location of the related attenuation paths on the touch surface, and
        intersecting the generated path maps.

6. The method of claim 5, wherein each path map is associated with one of said sheets of light, wherein the identifying comprises:
    forming pairs of path maps so as to minimize the angle between light rays in the associated sheets; and
    intersecting said pairs of path maps.

7. The method of claim 5, wherein the intersecting involves geometrically aligning the path maps and executing a logical AND operation on the path maps.

8. The method of claim 5, wherein each path map further represents the location of dead zones on the touch surface, in which the projection signal is insensitive to objects touching the touching surface.

9. The method of claim 2, wherein
    the obtaining includes,
        obtaining a plurality of projection signals; and
    the identifying includes,
        generating, for pairs of projection signals, a path map which represents intersections of the attenuation paths determined for the pair of projection signals, and
        intersecting the generated path maps.

10. The method of claim 9, wherein each projection signal is associated with one of said sheets of light, wherein the identifying comprises:
forming said pairs of projection signals so as to maximize the angle between light rays in the associated sheets.

11. The method of claim 2, wherein the determining the attenuation path comprises:
determining limits of the signal profile;
identifying a light path across the touch surface corresponding to the signal profile; and
retracing the limits across the touch surface based on the identified light path.

12. The method of claim 11, wherein the retracing the limits comprises:
applying a width function which is representative of a dependence of signal profile width on distance to the incoupling site due to light scattering.

13. The method of claim 12, wherein the width function represents the factual width of the object given the width of the signal profile, as a function of distance to the incoupling site.

14. The method of claim 2, wherein said determining the attenuation path comprises:
representing each attenuation path by a polygon.

15. The method of claim 14, wherein the polygon is a convex polygon.

16. The method of claim 1, wherein the sheets of light are generated by sweeping a first set of beams of light along a first incoupling site, thereby causing the first set of beams to be swept across the touch surface in a first main direction, and by sweeping a second set of beams of light along a second incoupling site, thereby causing the second set of beams to be swept across the touch surface in a second main direction.

17. The method of claim 1, wherein the sheets of light are generated in the form of beams that expand in the plane of the touch surface in a direction away from a respective incoupling site.

18. The method of claim 1, wherein each projection signal is associated with one of said sheets of light.

19. The method of claim 1, wherein the obtaining the projection signal comprises:
obtaining an energy signal representative of the spatial distribution of light energy within the outcoupling site; and
normalizing the energy signal by a background signal, wherein
the background signal represents the spatial distribution of light energy within the outcoupling site without objects touching the touch surface.

20. A tangible computer-readable medium storing computer code which, when executed on a data-processing system, causes the data-processing system to carry out the method of claim 1.

21. A device for determining touch data for one or more objects on a touch surface included in a touch-sensing apparatus, said touch-sensing apparatus including a light transmissive panel that defines the touch surface and an opposite surface, a light source arrangement for providing sheets of light inside the panel, wherein each sheet includes light that propagates by internal reflection between the touch surface and the opposite surface from an incoupling site to an outcoupling site, a light sensor arrangement for detecting light reaching the outcoupling site, wherein the touch-sensing apparatus is configured such that each object touching the touch surface locally attenuates at least two sheets of light, said device comprising:
an element for obtaining at least one projection signal which is indicative of a spatial distribution of light within said outcoupling site;
an element for processing said at least one projection signal for identification of signal profiles representing said attenuation;
an element for identifying, based on the signal profiles, one or more candidate touch areas on the touch surface;
an element for processing, after identifying the one or more candidate touch areas, said at least one projection signal to reconstruct a two-dimensional distribution of signal values only within said one or more candidate touch areas, the two-dimensional distribution of signal values being a two-dimensional image of signal energy attenuation values associated with the at least one projection signal; and
an element for determining touch data for the or each object by processing the reconstructed signal values within the candidate touch areas.

22. A method for determining touch data in a touch-sensing apparatus, said apparatus including a light transmissive panel that defines a touch surface and an opposite surface, a light source arrangement for providing sheets of light inside the panel, wherein each sheet includes light that propagates by internal reflection between the touch surface and the opposite surface from an incoupling site to an outcoupling site, said apparatus further including a light sensor arrangement for detecting light reaching the outcoupling site, wherein the touch-sensing apparatus is configured such that one or more objects touching the touch surface causes a local attenuation of at least two sheets of light, said method comprising:
obtaining at least one projection signal which is indicative of a spatial distribution of light within said outcoupling site;
processing said at least one projection signal for identification of signal profiles representing said attenuation;
determining, for each signal profile, an attenuation path across the touch surface, wherein the attenuation path has a width which is determined based on the signal profile;
identifying, as a function of a set of thus-determined attenuation paths, one or more candidate touch areas on the touch surface;
processing, after identifying the one or more candidate touch areas, said at least one projection signal to reconstruct a two-dimensional distribution of signal values only within said one or more candidate touch areas, the two-dimensional distribution of signal values being a two-dimensional image of signal energy attenuation values associated with the at least one projection signal; and
determining touch data for the or each object by processing the reconstructed signal values within the candidate touch areas.

* * * * *